United States Patent
Davey et al.

(10) Patent No.: US 10,715,025 B2
(45) Date of Patent: Jul. 14, 2020

(54) RADIAL MAGNETIC CYCLOID GEAR ASSEMBLIES, AND RELATED SYSTEMS AND METHODS

(71) Applicant: NATIONAL OILWELL VARCO, L.P., Houston, TX (US)

(72) Inventors: Kent R. Davey, Edgewater, FL (US); Kenneth Seyffert, Houston, TX (US); Cliff A. Swiontek, Brea, CA (US); Tim Duggan, Hacienda Heights, CA (US); Timothy Montgomery, Corona, CA (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 298 days.

(21) Appl. No.: 15/762,765

(22) PCT Filed: Oct. 1, 2015

(86) PCT No.: PCT/US2015/053407
§ 371 (c)(1),
(2) Date: Mar. 23, 2018

(87) PCT Pub. No.: WO2017/058228
PCT Pub. Date: Apr. 6, 2017

(65) Prior Publication Data
US 2019/0028014 A1    Jan. 24, 2019

(51) Int. Cl.
*H02K 49/10* (2006.01)
*F16H 1/32* (2006.01)
(Continued)

(52) U.S. Cl.
CPC ............. *H02K 49/102* (2013.01); *E21B 3/04* (2013.01); *F03D 9/25* (2016.05); *F16H 1/32* (2013.01);
(Continued)

(58) Field of Classification Search
None
See application file for complete search history.

(56) References Cited

U.S. PATENT DOCUMENTS

| | | | |
|---|---|---|---|
| 3,130,824 A | | 4/1964 | Anderson |
| 3,864,587 A | * | 2/1975 | Landry ............... H02K 49/102 310/103 |

(Continued)

FOREIGN PATENT DOCUMENTS

| | | |
|---|---|---|
| CN | 101456632 B | 4/2012 |
| CN | 102420549 A | 4/2012 |

(Continued)

OTHER PUBLICATIONS

International Search Report and Written Opinion for corresponding International Patent Application No. PCT/US2015/053407, dated Dec. 29, 2015.

(Continued)

*Primary Examiner* — Dirk Wright
(74) *Attorney, Agent, or Firm* — Jones Robb, PLLC

(57) ABSTRACT

A magnetic cycloid gear assembly includes an outer magnet drum comprising a plurality of outer drum magnets having a first number of magnetic pole pairs. The assembly also includes a first inner magnet drum comprising a first plurality of inner drum magnets having a second number of magnetic pole pairs. The assembly also includes a second inner magnet drum comprising a second plurality of inner drum magnets having a third number of magnetic pole pairs. Each of the first and second inner drums has an inner magnet drum axis that is offset from an outer magnet drum axis. The assembly further includes a plurality of drive mechanisms, each mechanism being operatively coupled to each of the first and second inner drums. The plurality of drive mechanisms is configured to drive each of the first and second (Continued)

inner magnet drums to revolve in an eccentric manner about the outer drum axis.

20 Claims, 16 Drawing Sheets

(51) Int. Cl.
    *F03D 9/25*     (2016.01)
    *E21B 3/04*     (2006.01)
    *F16H 49/00*     (2006.01)
    *E21B 19/00*     (2006.01)

(52) U.S. Cl.
    CPC ..... *E21B 19/008* (2013.01); *F05B 2220/7068* (2013.01); *F16H 49/001* (2013.01)

(56) References Cited

U.S. PATENT DOCUMENTS

| | | | |
|---|---|---|---|
| 4,819,975 A | 4/1989 | Morishita et al. | |
| 4,850,821 A * | 7/1989 | Sakai | F04D 13/027 417/420 |
| 5,013,949 A * | 5/1991 | Mabe, Jr. | H02K 49/102 310/103 |
| 5,569,111 A * | 10/1996 | Cho | H02K 49/102 310/103 |
| 8,210,980 B2 * | 7/2012 | Gravio | F16H 49/005 475/149 |
| 8,581,461 B2 * | 11/2013 | Lin | F03G 7/08 290/1 A |
| 8,810,099 B2 * | 8/2014 | Huang | H02K 49/102 310/112 |
| 8,979,698 B2 * | 3/2015 | Chicurel Uziel | F16F 15/14 475/165 |
| 9,850,906 B2 * | 12/2017 | Ozaki | H02K 7/09 |
| 10,407,815 B2 * | 9/2019 | Fukui | H02K 49/102 |
| 10,439,543 B2 * | 10/2019 | Diao | H02P 29/0027 |
| 2007/0107685 A1 | 5/2007 | Farah | |
| 2007/0186692 A1 | 8/2007 | Waszak et al. | |
| 2009/0251258 A1 | 10/2009 | Rhinefrank et al. | |
| 2010/0207472 A1 | 8/2010 | Atallah | |
| 2010/0237731 A1 | 9/2010 | Gravio | |
| 2012/0223606 A1 | 9/2012 | Storaasli | |
| 2013/0205942 A1 | 8/2013 | Chicurel Uziel et al. | |
| 2016/0049855 A1 | 2/2016 | Davey | |
| 2016/0156254 A1 * | 6/2016 | Bowen | H02K 49/102 310/68 B |

FOREIGN PATENT DOCUMENTS

| | | |
|---|---|---|
| CN | 102447376 A | 5/2012 |
| CN | 102739116 A | 10/2012 |
| WO | 2006133703 A1 | 12/2006 |
| WO | 2013130936 A2 | 9/2013 |
| WO | 2014158968 A1 | 10/2014 |

OTHER PUBLICATIONS

International Search Report and Written Opinion for related International Patent Application No. PCT/US2014/021168, dated Jun. 23, 2014.
Extended European Search Report for related European Patent Application No. 14773994.0, dated Oct. 12, 2016.
Frank T. Jorgensen et al., "The Cycloid Permanent Magnetic Gear", IEEE Transactions on Industry Applications, vol. 44, No. 6, Nov. 1, 2008.
Communication from the European Patent Office in related European Patent Application No. 14 773 994.0, dated Jun. 20, 2017.
Communication from the European Patent Office in related European Patent Application No. 14 773 994.0, dated Nov. 17, 2017.
Non-Final Office Action issued in co-pending U.S. Appl. No. 14/774,829, dated Jan. 11, 2018.
Extended European Search Report from corresponding Application 15905608.4, dated Jul. 9, 2019.

* cited by examiner

RADIAL MAGNETIC CYCLOID GEAR ASSEMBLIES, AND RELATED SYSTEMS AND METHODS

This application is a U.S. national stage application under 35 U.S.C. § 371(c) of International Patent Application No. PCT/US2015/053407, filed internationally on Oct. 1, 2015, which is incorporated by reference herein in its entirety.

TECHNICAL FIELD

The present disclosure relates to radial magnetic cycloid gear assemblies, and related systems and methods for rotary drives, including for example, for use in various rotary driven industrial equipment, such as, for example, ship engines, wind turbine nacelles, and various oil rigging equipment.

INTRODUCTION

The section headings used herein are for organizational purposes only and are not to be construed as limiting the subject matter described in any way.

Gearboxes and gear arrangements are utilized in a wide range of applications in order to provide speed and torque conversions from a rotating power source to another device. Traditionally, gearboxes have been formed from gear rings, or wheels, each being sized and having a number of teeth selected to provide a desired gear ratio, which in turn affects the torque ratio. Such mechanical gearboxes, however, may produce relatively large acoustic noise and vibration. Also, the mechanical components of gearboxes are subject to wear and fatigue (e.g., tooth failure), and require periodic lubrication and maintenance. Moreover, mechanical gear arrangements can have inefficiencies as a result of contact friction losses.

Magnetic gear arrangements have been developed as a substitute for mechanical gear arrangements. Some magnetic gears are planetary in their arrangement and comprise respective concentric gear rings with interpoles positioned between the gear rings. The rings incorporate permanent magnets, and the interpoles act to modulate (shutter) the magnetic flux transferred between the permanent magnets of the gear rings. In this manner, there is no mechanical contact between the gear rings or the input and output shafts of the gearbox. Thus, utilizing such magnetic gear arrangements may alleviate many of the noise and wear issues associated with mechanical gears that rely on intermeshing teeth.

Other magnetic gear arrangements are analogous to mechanical cycloid gears. Some such gears include harmonic gears that utilize a flexible, thin-walled toothed spline structure that moves within and intermeshes with a fixed outer toothed spline; the latter structure sometimes being referred to as a skin. A wave generator may be attached to an input shaft that is rotated within the flexible spline to rotate the flexible spline around and within the outer fixed spline, with the flexible inner spline being attached to an output shaft. Mechanical harmonic gears generally are characterized by relatively high gear ratios and minimal backlash, which is the error in motion that occurs based on the size of the gap between the leading face of the tooth on the driven gear and the trailing face on the tooth of the driving gear. The flexible spline structures of mechanical harmonic gears are a relatively weak structural component that limits the output torque of such gears, thus providing relatively low output torques.

In at least one analogous magnetic cycloid gear arrangement, an inner rotor gear ring supports an array of magnets and an outer stator gear ring supports an array of magnets. The number of magnets on the inner and outer gear rings differ, and the inner rotor gear ring axis is offset from the outer stator gear ring axis. The inner rotor gear ring is allowed to also freely rotate about its own axis as it is driven by a drive shaft aligned with the outer stator gear ring axis. The nearest magnets between the inner and outer gear rings have the strongest attraction. When the shaft creating the eccentric rotation ("wobble") makes a full rotation, the inner rotor gear ring has not returned to its original position because of the different number of magnets. That slight rotation shift can be used to create a large torque.

Although existing magnetic gears, whether planetary or cycloidal, alleviate some of the drawbacks associated with mechanical gears, and can offer relatively high gear ratios, there exists a continued need for improvement in magnetic gear arrangements. For example, there exists a continued need to improve upon the torque density in magnetic gears. Moreover, there exists a continued need to provide magnetic gear arrangements and components that support higher torque outputs. There also exists a need in various industrial applications to drive rotary equipment with torque conversion systems, such as gears, that are able to withstand potentially harsh environments that may damage conventional mechanical gears and/or require relatively high maintenance; for example, in ships, wind turbines, and in the oil and gas drilling industry, there exists a need to improve upon the motors and gearing equipment used to drive rotary equipment.

SUMMARY

The present disclosure may solve one or more of the above-mentioned problems and/or achieve one or more of the above-mentioned desirable features. Other features and/or advantages may become apparent from the description which follows.

In accordance with various exemplary embodiments of the present disclosure, a magnetic cycloid gear assembly may include an outer magnet drum comprising a plurality of outer drum magnets having a first number of magnetic pole pairs. The outer magnet drum may have an outer magnet drum axis. The assembly may also include a first inner magnet drum comprising a first plurality of inner drum magnets having a second number of magnetic pole pairs. The first inner magnet drum may have a first inner magnet drum axis that is offset from the outer magnet drum axis. The assembly may also include a second inner magnet drum comprising a second plurality of inner drum magnets having a third number of magnetic pole pairs. The second inner magnet drum may have a second inner magnet drum axis that is offset from the outer magnet drum axis. The outer magnet drum may surround the inner magnet drums. The assembly may further include a plurality of drive mechanisms, each drive mechanism being operatively coupled to each of the first and second inner magnet drums. The plurality of drive mechanisms may be configured to drive each of the first and second inner magnet drums to revolve in an eccentric manner about the outer drum axis. And, the outer magnet drum may be configured to rotate about the outer magnet drum axis in response to the revolution of the first and second inner magnet drums.

In accordance with various additional exemplary embodiments of the present disclosure, a method of torque conversion may include revolving first and second inner magnet drums within an outer magnet drum in an eccentric manner about an axis of rotation of the outer magnet drum. Each of the first and second inner magnet drums may include a first plurality of magnets having a first number of pole pairs and the outer magnet drum comprises a second plurality of magnets having a second number of pole pairs that differs from the first number of pole pairs. The revolving may be provided by a plurality of drive mechanisms each configured to provide a high speed, low torque input. The method may further include, in response to the revolving of the inner magnet drums, causing the outer magnet drum to rotate about the outer magnet drum axis of rotation to provide a low speed, high torque output.

Additional objects and advantages will be set forth in part in the description which follows, and in part will be obvious from the description, or may be learned by practice of the present teachings. At least some of the objects and advantages of the present disclosure may be realized and attained by means of the elements and combinations particularly pointed out in the appended claims.

It is to be understood that both the foregoing general description and the following detailed description are exemplary and explanatory only and are not restrictive of the present disclosure or claims. It should be understood that the inventions, herein their broadest sense, could be practiced without having one or more features of these exemplary aspects and embodiments.

BRIEF DESCRIPTION OF DRAWINGS

The accompanying drawings, which are incorporated in and constitute a part of this specification, illustrate some exemplary embodiments of the present disclosure and together with the description, serve to explain certain principles. In the drawings.

DESCRIPTION OF EXEMPLARY EMBODIMENTS

Reference will now be made in detail to various exemplary embodiments of the present disclosure, examples of which are illustrated in the accompanying drawings. Wherever possible, the same reference numbers will be used throughout the drawings to refer to the same or like parts.

In accordance with various exemplary embodiments, magnetic cycloid gear arrangements can provide improved performance (e.g., gear ratios and output torque densities) with less magnet volume than various other magnetic gear configurations. For example, various exemplary embodiments of magnetic cycloid gears described herein, may achieve gear ratios of at least 15:1, for example in the range of from 15:1 to 75:1. In various exemplary embodiments, the magnetic cycloid gears can be sized to achieve a torque output sufficient for driving various rotary equipment and turbine engines where high torque density drive is desirable. Non-limiting examples of application of the gears of the present disclosure include a top drive in an oil drilling rig, a nacelle tower of a wind turbine, a drive train of a ship. The torque achievable ranges from 0 to full rating. In an exemplary embodiment, a magnetic cycloid gear arrangement that achieves such torque outputs may be about 26 in. in height and about 24 in. in diameter. Accordingly, the torque input required to drive the gear rotor only has to deliver 1/30-1/31 of the torque, and thus may be relatively small. As a consequence, the gear arrangements in accordance with various exemplary embodiments may utilize relatively small motors that can be placed in relatively small and/or confined spaces associated with the gear, such as, for example, inside the gear's inner magnet drums. This may permit providing gear arrangements that are relatively compact.

In various exemplary embodiments, for example, magnetic cycloid gear assemblies in accordance with the present disclosure may be useful to deliver torque to drive a variety of rotary equipment, including but not limited to, for example rotary equipment in oil drilling systems. The use of such magnetic cycloid gear assemblies in accordance with the present disclosure in oil drilling systems and other applications may be desirable as the arrangements can be relatively compact in design, with relatively few components that deliver high torque in an integrated motor/gear system. Moreover, the use of magnetic gearing can reduce vibrations, acoustic issues, and wear that are associated with conventional mechanical (e.g., toothed) gear systems. Also, by reducing the number of contacting mechanical parts, friction losses and potential damage due to harsh environments, as are sometimes associated with oil drilling rigs and other industrial applications, can be mitigated using magnetic gearing arrangements.

Figure 16:
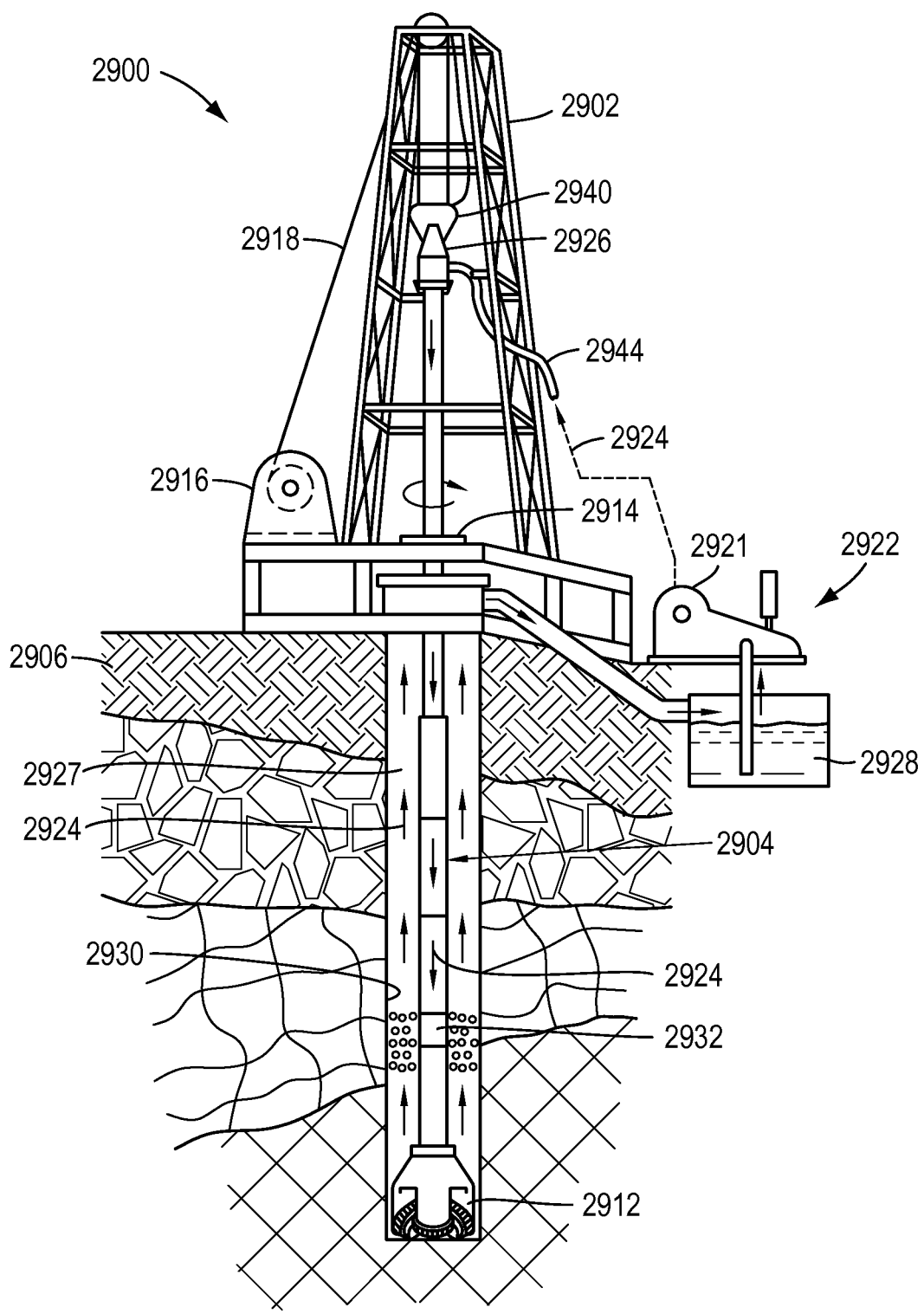
FIG. 16 is a schematic view of an exemplary oil drilling rig system with which magnetic cycloid gear assemblies in accordance with various exemplary embodiments of the present disclosure may be used to drive rotary equipment of the system.

Reference is made to FIG. 16, which illustrates a schematic diagram depicting an oil drilling rig 2900 for which the magnetic cycloid gear assemblies in accordance with various exemplary embodiments may be used in accordance with aspects of the present disclosure. The rig 2900 includes a derrick 2902 from which extends a drill string 2904 into the earth 2906. The drill string 2904 can include drill pipes and drill collars. A drill bit 2912 is at the end of the drill string 2904. A rotary system 2914, top drive 2926, and/or a downhole drive 2932 (e.g., a "fluid motor", "mud motor", electric, hydraulic, mud, fluid, or other type based on available utilities or other operational considerations) may be used to rotate the drill string 2904 and the drill bit 2912. The top drive 2926 is supported under a travelling block 2940, which can travel up and down in the derrick 2902. A draw works 2916 has a cable or guy wire apparatus 2918 for raising and lowering the drill string 2904. A system 2922 with one, two, or more mud pump systems 2921 supplies drilling fluid 2924 using hose 2944 to the drill string 2904, which passes through the center of the top drive 2926. Drilling forms a wellbore 2930 extending down into the earth 2906.

During drilling, the drilling fluid 2924 is pumped by mud pump(s) 2921 of the system 2922 into the drill string 2904 passing through the top drive 2926 (thereby operating a downhole drive 2932 if such is used). Drilling fluid 2924 flows to the drill bit 2912, and then flows into the wellbore 2930 through passages in the drill bit 2912. Circulation of the drilling fluid 2924 transports earth and/or rock cuttings, debris, etc. from the bottom of the wellbore 2930 to the surface through an annulus 2927 between a well wall of the wellbore 2930 and the drill string 2904. The cuttings are removed from the drilling fluid 2924 so that the fluid may be re-circulated from a mud pit or container 2928 by the pump(s) of the system 2922 back to the drill string 2904. In operation, the rotary equipment, such as top drive 2926, draw works 2916, mud pumps 2921, may be driven by motors and one or more magnetic cycloid gear assemblies in accordance with exemplary embodiments herein, which can provide a large torque at a low speed.

Figure 17:
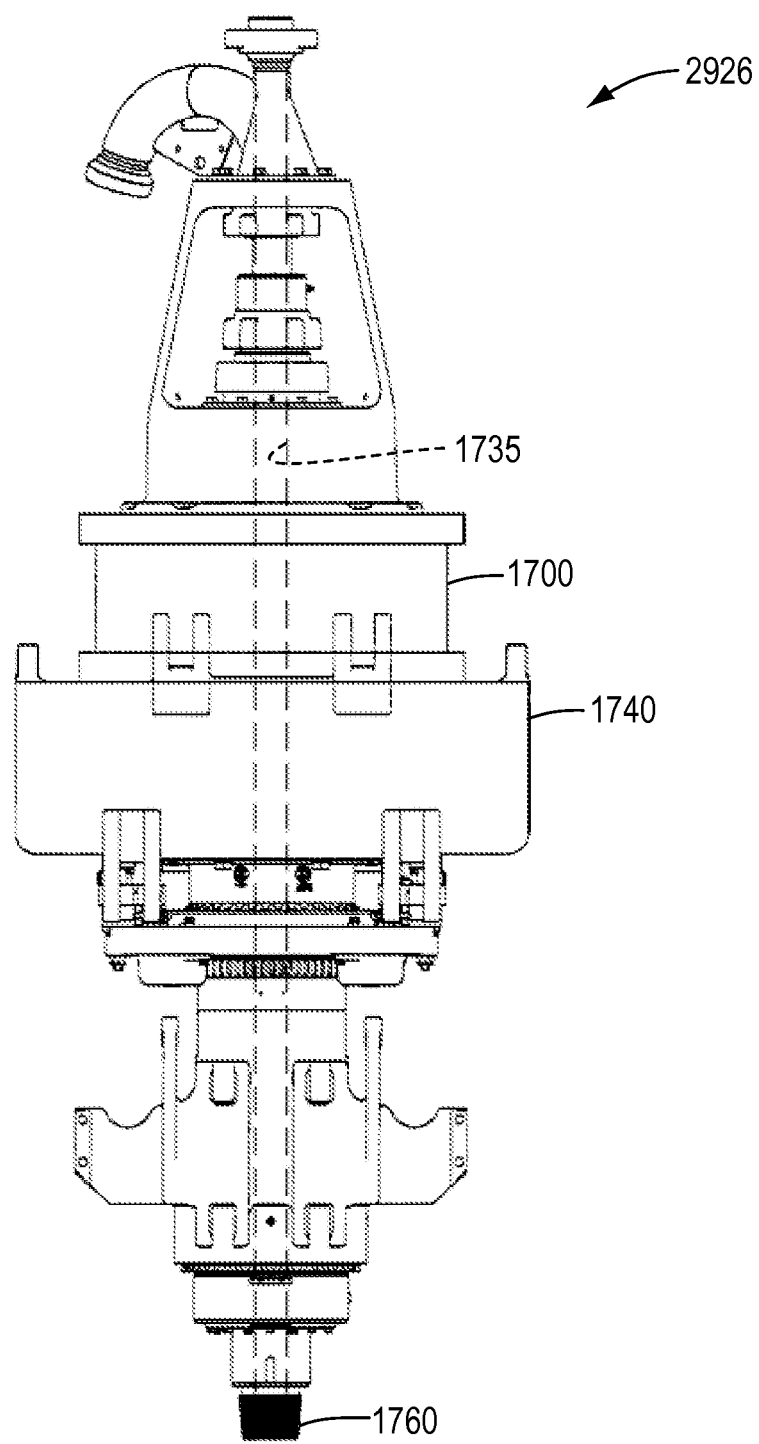
FIG. 17 is a diagrammatic perspective view of a top drive with an integrated magnetic cycloid gear and motor drive assembly in accordance with various exemplary embodiments of the present disclosure.

FIG. 17 illustrates one exemplary embodiment of a top drive 2926 with an integrated magnetic cycloid gear and motor drive assembly 1700 in accordance with various exemplary embodiments, as will be described further below (see, e.g., FIGS. 3-14). Other parts of the top drive include a swivel house 1740 and main shaft 1760. The magnetic cycloid gear and drive assembly 1700 may have a passage 1735 there through (e.g., like mud pipes described in further detail below). The output of the drive may be of high torque and slow speed in an industrial scale, or varied torque/speed characteristics.

Magnetic Cycloid Gears

Figure 1A:
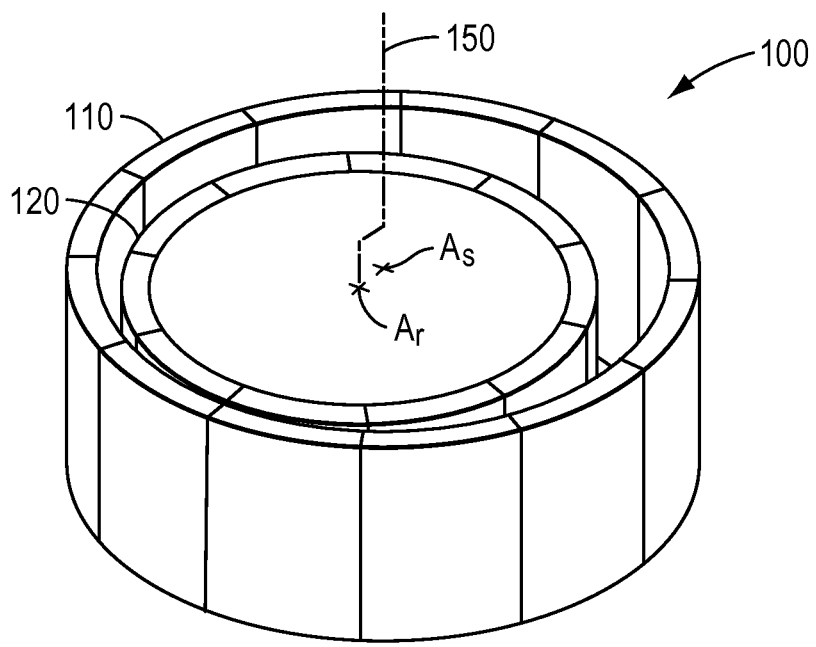
FIGS. 1A and 1B are schematic perspective and plan views, respectively, of a conventional magnetic cycloid gear.
Figure 1B:
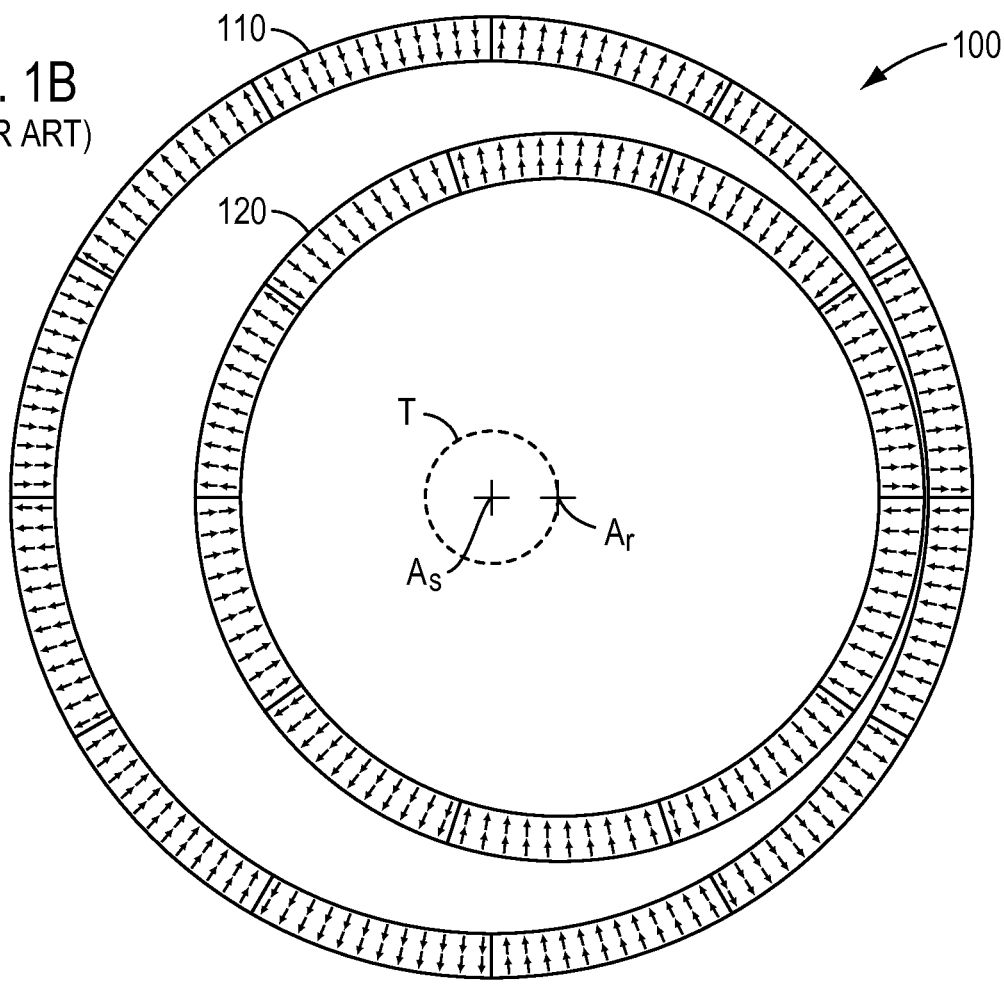

Referring now to FIGS. 1A and 1B, operation of conventional magnetic cycloid gears will now be described. As shown in FIGS. 1A and 1B, in a magnetic cycloid gear arrangement 100, a rotor axis $A_r$ is displaced with respect to a stator axis $A_s$ (e.g., to the right in the view and position of the gear rings in FIGS. 1A and 1B). In other words, inner and outer gear rings 120 and 110 are positioned in a non-concentric manner such that their respective axes $A_r$, and $A_s$ are not aligned. If either the inner gear ring 120 or the outer gear ring 110 is allowed to move as a whole such that its axis traces a small orbital path (e.g., revolves), magnets carried by the inner and outer gear rings 120, 110 will be in closest proximity at various angular positions during the revolving. By way of example, if the inner ring 120 is allowed to also rotate about its axis $A_r$, while it revolves (orbits) around the outer gear ring 110 axis as the outer gear ring 110 is held stationary, a gear ratio is produced. In another example, if the inner gear ring 120 is held stationary and the outer gear ring 110 is allowed to revolve as described above, while also rotating about its own axis $A_s$, another gear ratio is produced.

In such a magnetic cycloid gear arrangement, the inner gear ring 120 may be driven by an eccentric input drive shaft 150 that is aligned with the outer gear ring 110 axis $A_s$ at its input rotation axis and is fixed at its other end to the inner gear ring axis $A_r$. In this manner, when the input drive shaft 150 is rotated (i.e., about the axis $A_s$), the end of the input shaft 150 that is fixed at the axis $A_r$ (and thus the position of $A_r$) traces out the trajectory T shown in the dashed lines of FIG. 1B.

To better understand the motions being described, additional reference is made to FIGS. 19A-19D which schematically depict the motion of an inner gear ring 120B revolving (orbiting) around the axis of rotation a of outer gear ring 110A. As outer gear ring 110A rotates about axis a along path A, inner gear ring 120B revolves around axis a such that the axis b of inner gear ring 120B moves along path B. As can be seen by the different positions in FIGS. 19A-19D, the inner gear ring 120B is prevented from rotating about its axis b during the revolution around axis a and accordingly the orientation of inner gear ring 120B does not change, as depicted by the arrow being oriented in the same direction in each of FIGS. 19A-19D.

Figure 2A:
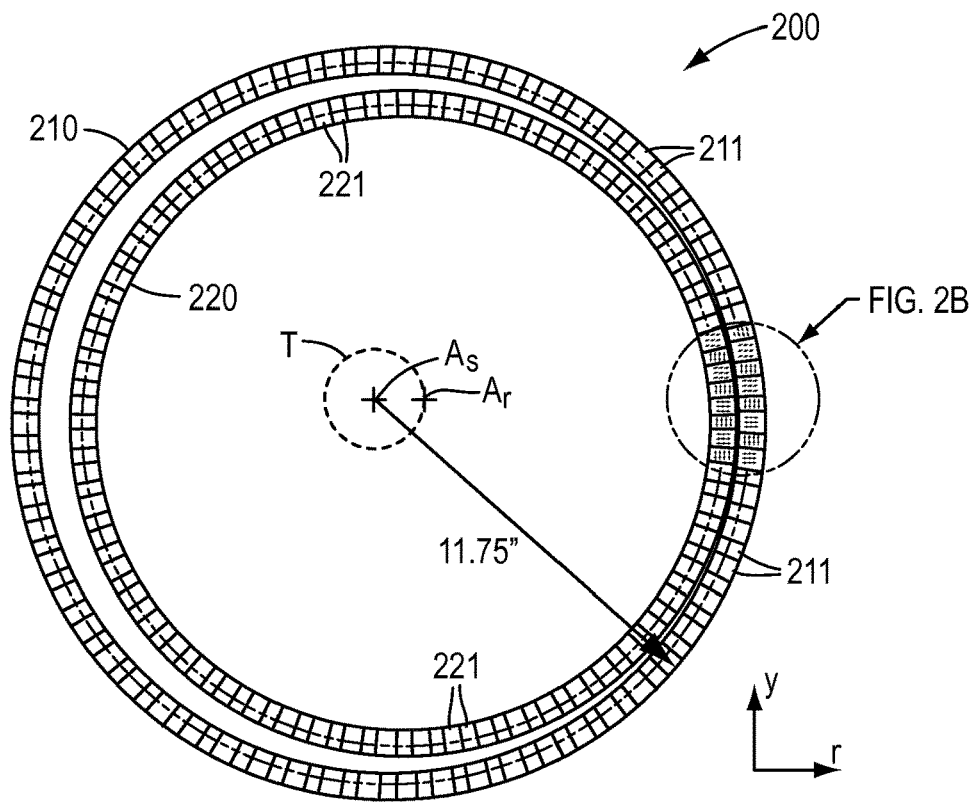
FIGS. 2A and 2B are schematic plan and partial detailed views, respectively, of an exemplary magnetic cycloid gear arrangement illustrating principles of operation in accordance with the present disclosure.
Figure 2B:
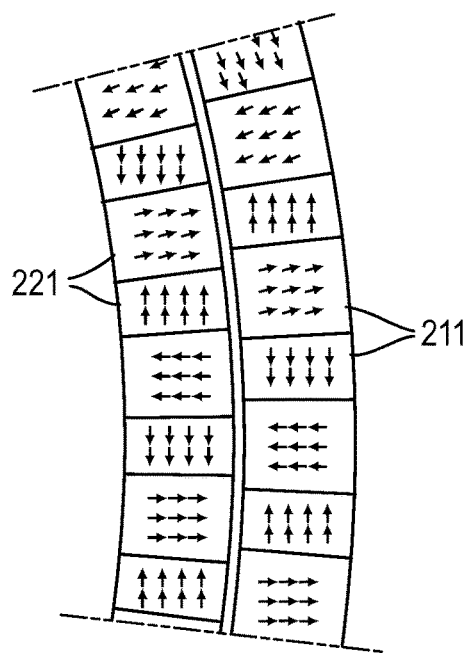

As described, for example, in International Publication No. WO 2014/158968 A1, entitled "Magnetic Cycloid Gear," which is incorporated by reference in its entirety herein, the gear operation of converting of an input torque/speed to an output torque/speed of a magnetic cycloid gear occurs when the number of magnets on the input and output gear rings differ, with the largest breakout torque being realized when the pole pair difference is one. FIGS. 2A and 2B show schematic plan and partial detailed views of another exemplary magnetic cycloid gear arrangement 200 that includes inner and outer gear rings 220, 210 carrying magnets 221, 211 arranged in a partial Halbach arrangement with 30 pole pairs (60 magnetic poles) on the inner gear ring 220 and 31 pole pairs (62 magnetic poles) on the outer gear ring 210. Because they are arranged in a Halbach array with tangential magnets, the number of magnets for the inner and outer rings 220, 210 is 120 and 124, respectively. In FIGS. 2A and 2B, two blocks represent one magnet pole and four blocks represents one magnet pole pair. In one exemplary embodiment, the radius of the inner gear ring 220 may be ⅝" smaller than the outer gear ring 110 and its center displaced 0.5 in. horizontally (to the right in the position and orientation of FIG. 2A). As above, when the inner gear ring 220 is coupled to an input shaft to rotate such that its axis $A_r$ traces the dashed line T, the inner gear ring 220 also can undergo a relatively slow rotation in the same direction about its own axis $A_r$ equal to a revolution of −2/60*360° for one complete revolution of the axis $A_r$ of the inner gear ring 220 about the trajectory T. Therefore, this would be a −60/2 or a 30:−1 gear ratio. This rotation about $A_r$ results from the coupling between the magnets 221 and 211 in light of the differential pole pairs between the two rings 220, 210.

As described in International Publication No. WO 2014/158968 A1, incorporated by reference herein, to achieve higher gear ratios, various magnetic gear arrangements also prohibit the free rotation of one of the gear rings 210, 220 around its own axis, such as for example prohibiting the free rotation of the inner gear ring 220 around its axis $A_r$, while permitting it to revolve such that its axis traces out a small inner orbital trajectory (e.g., T in FIG. 2A). In addition, such gear arrangements contemplate permitting the other of the gear rings to rotate freely about its own axis in response to the magnetic coupling caused by the motion of the inner gear ring 220. For example, the outer gear ring 210 may be permitted to rotate freely around its axis $A_s$ in response to movement of the inner gear ring 220. In the example arrangement of FIGS. 2A and 2B, the outer ring 210 may therefore rotate in the same direction 2/62*360° for every complete revolution of the axis $A_r$ of the inner gear ring 220 about the trajectory T. Such a gear arrangement can achieve a gear ratio of about 61:2 or 30.5:1, or about 31:1.

Implementation into a Magnetic Cycloid Gear Assembly

Various exemplary embodiments of the present disclosure contemplate utilizing the above magnetic cycloid gear arrangements in assemblies which integrate such gears with a plurality of drive mechanisms, such as, for example, motors or generators. In accordance with various embodiments, for example, a high torque density motor for use with a top drive, as described above, may incorporate such magnetic cycloid gear assemblies. Although such assemblies may generally achieve a high torque density compared with other types of magnetic gears, this torque advantage may pose other issues. First, because the inner gear ring (or inner drum) undergoes a cycloidal or wobble motion, it can be unbalanced and thus introduces considerable vibration with accompanying bearing wear. Second, there is a very large magnetic load on the bearings of the wobbling inner drum.

Figure 20:
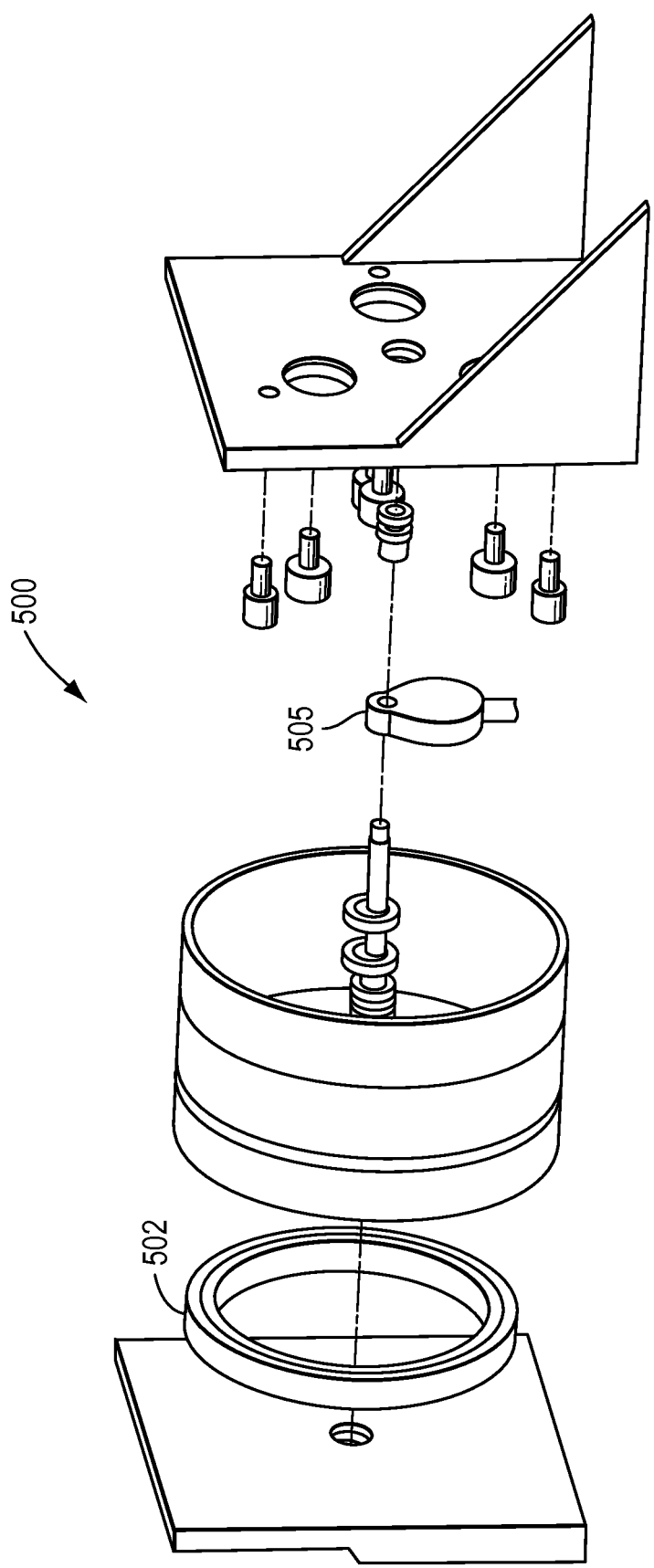
FIG. 20 is an exploded perspective view of another exemplary embodiment in accordance with the present disclosure.

In an exemplary embodiment, counterweights are used to balance the inner drum during its wobble motion. With reference to FIG. 20, an exemplary embodiment of a magnetic cycloid gear assembly 500 that uses one inner magnet drum 502 and a counterweight 505 is shown. In such a configuration, the counterweight 505 may be attached to the rotor of the drive motor (not shown) to compensate for the material offset of the inner magnet drum 502 with respect to the primary rotation axis (i.e., during the wobble). In this manner, the counterweight 505 may bring the center of mass of the assembly 500 back to the primary rotation axis.

The present disclosure further contemplates overcoming such issues with a uniquely designed magnetic cycloid gear assembly that: (1) utilizes a plurality of inner drums, which are positioned to offset each other's eccentric motion, and/or (2) distributes the magnetic load among a plurality of drive mechanisms. In other words, by using a plurality of inner drums and drive mechanisms, magnetic cycloid gear assemblies in accordance with the present disclosure may be balanced mechanically, thereby eliminating the use of a counterweight.

Figure 3:
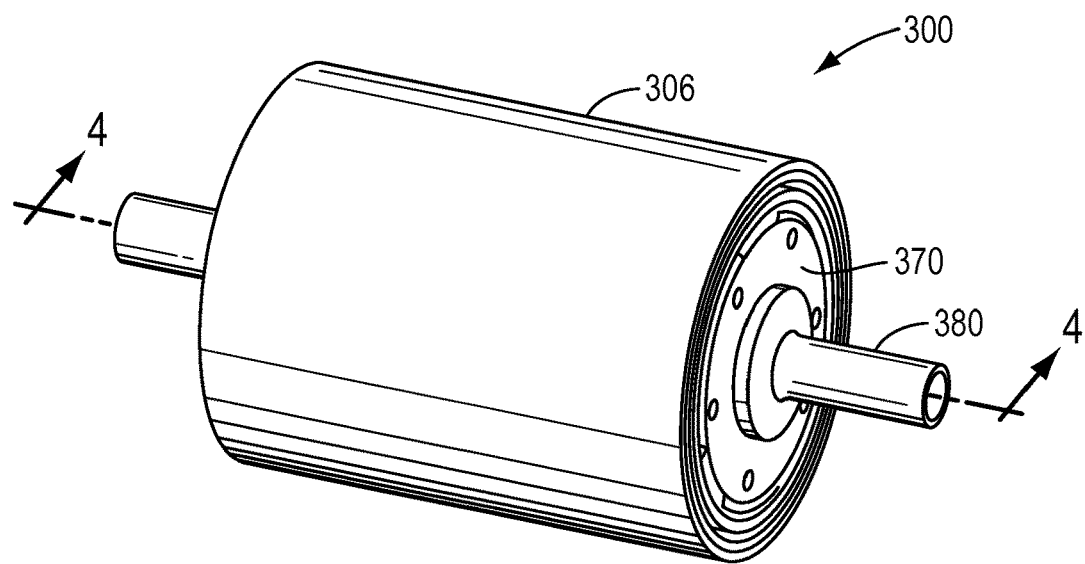
FIG. 3 is a perspective view of an exemplary embodiment of a magnetic cycloid gear assembly for use with a top drive in accordance with the present disclosure.
Figure 4:
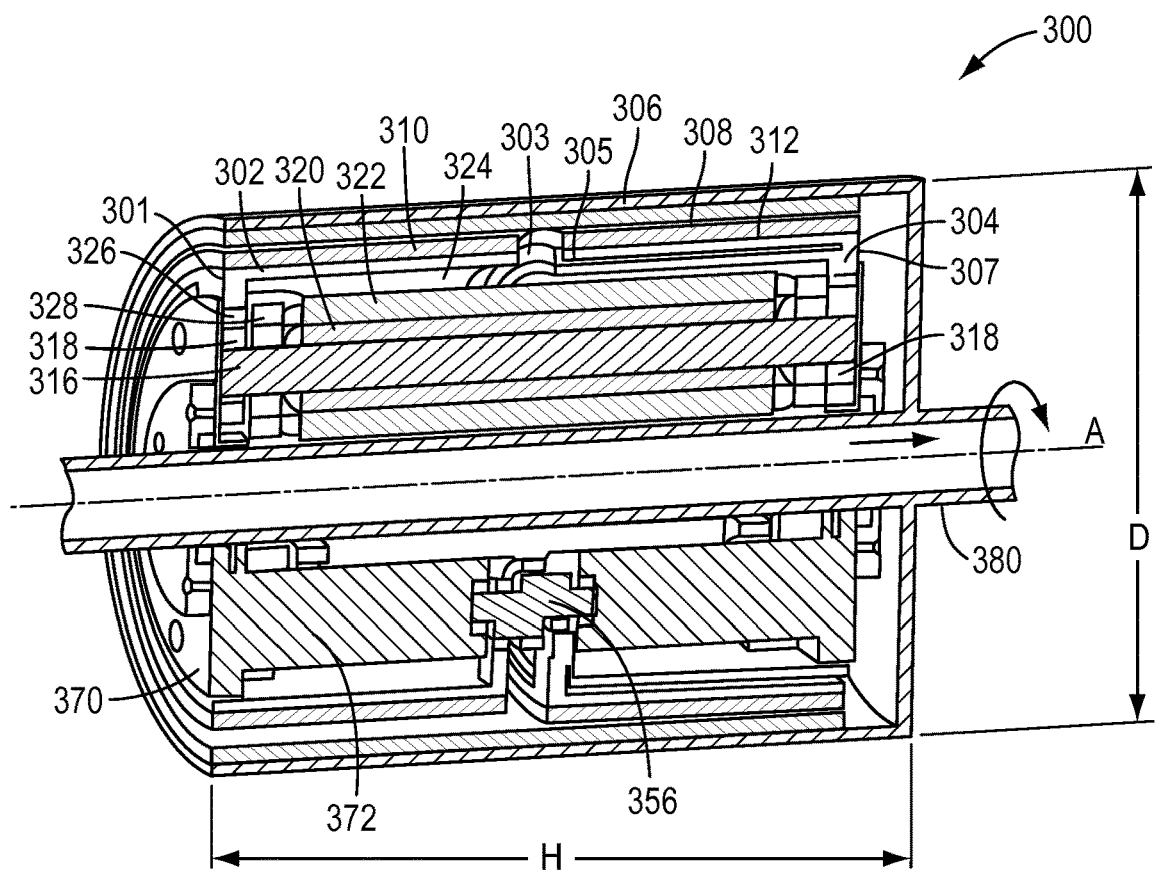
FIG. 4 is a perspective, cross-sectional view of the assembly of FIG. 3 taken along line 4-4 in FIG. 3, with a support structure removed to better shown the internal components of the assembly.

With reference now to FIGS. 3-14, an exemplary embodiment of a magnetic cycloid gear assembly 300 that uses plural inner drums and drive mechanisms as mentioned above is shown. As perhaps illustrated best in FIGS. 4 and 5 (in which a support structure 350 has been removed to better show the internal components of the assembly 300), the assembly 300 includes first and second inner magnet drums 302 and 304 (or first and second inner gear rings), and an outer magnet drum 306 (or outer gear ring) that surrounds the inner magnet drums 302, 304. In various embodiments, for example, as shown in FIG. 4, the first and second inner magnet drums 302, 304 are disposed in an end-to-end arrangement within the outer magnet drum 306.

The outer magnet drum 306 includes a plurality of outer drum magnets 308 having a first number of magnetic pole pairs and an outer drum axis $A_s$ (see FIG. 2A). In the same manner, the first inner magnet drum 302 includes a first plurality of inner drum magnets 310 having a second number of magnetic pole pairs and a first inner magnet drum axis $A_r$ (see FIG. 2A) that is offset from the outer drum axis $A_s$. And, the second inner magnet drum 304 includes a second plurality of inner drum magnets 312 having a third number of magnetic pole pairs and a second inner magnet drum axis $A_r$ (see FIG. 2A) that is offset from the outer magnet drum axis $A_s$.

To achieve a high torque density, in various exemplary embodiments, at least one of the second and third number of magnetic pole pairs differs from the first number of magnetic pole pairs. For example, the second and third number of magnetic pole pairs may be equal to each other and both differ from the first number of magnetic pole pairs. As above, to maximize the breakout torque, in various exemplary embodiments, the pole pair difference between the pole pairs of the outer magnet drum 306 and the respective pole pairs of the two inner magnet drums 302, 304 is about 1. For example, similar to the magnetic cycloid gear arrangement 200 discussed above, to provide a gear ratio of 31:1, the outer drum magnets 308 may have 31 pole pairs and each of the inner drum magnets 310, 312 may have 30 pole pairs.

Figure 5:
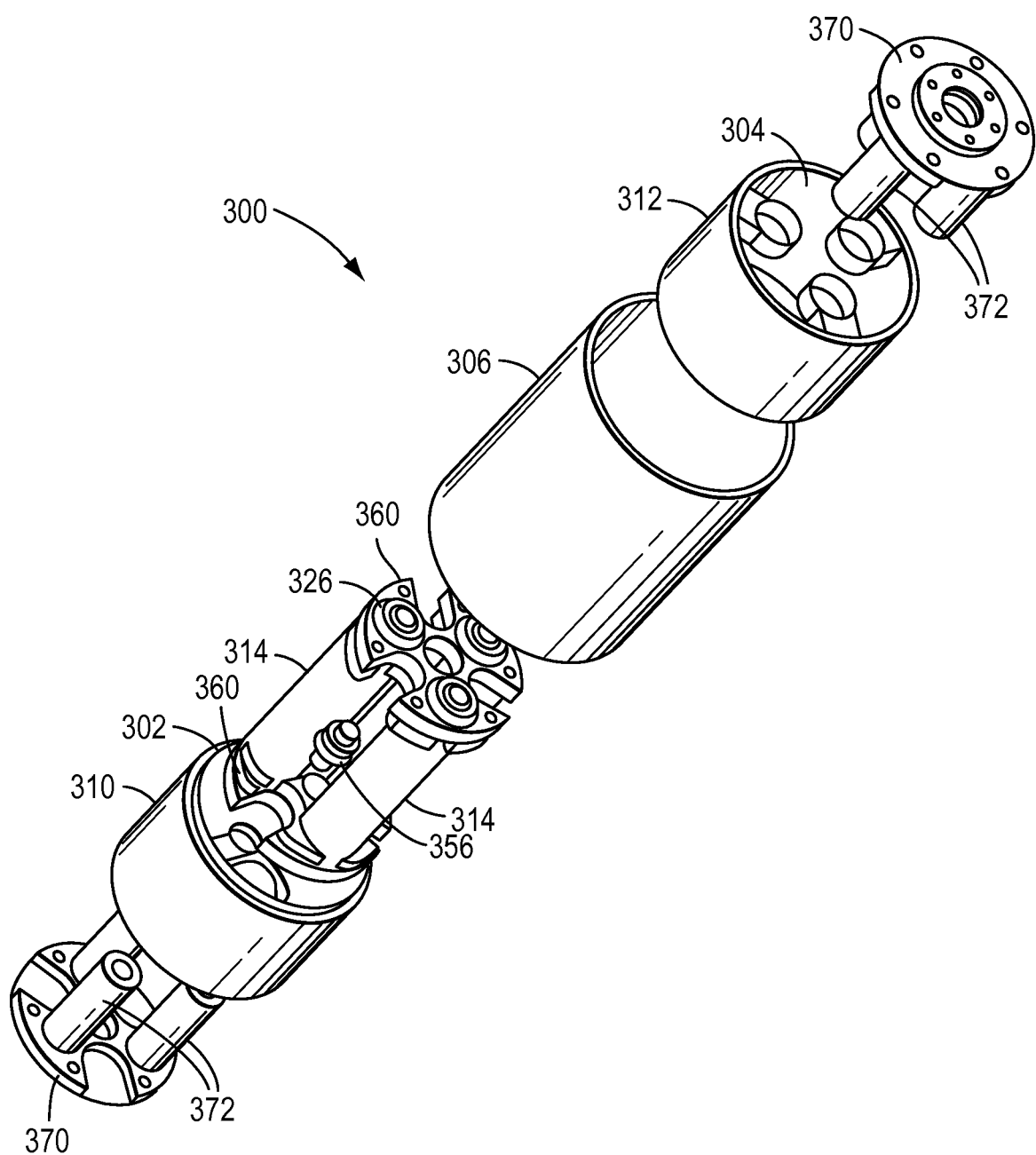
FIG. 5 is an exploded perspective view of the assembly of FIG. 3, with the support structure removed to show the assembly's drive mechanisms.

As further shown in FIG. 5, the magnetic cycloid gear assembly 300 also includes a plurality of drive mechanisms 314 (three drive mechanisms 314 being shown in the exemplary embodiment of FIG. 5), wherein each drive mechanism is operatively coupled to each of the first and second inner magnet drums 302, 304 to drive each of the first and second inner magnet drums 302, 304 to revolve in an eccentric manner about the outer drum axis $A_s$ (e.g. about the trajectory T in a manner similar to that depicted in FIG. 2A). Each drive mechanism includes a shaft 316 that is configured to rotate and to support each of the inner magnet drums 302, 304. The shafts 316 are configured to rotate synchronously with each other to drive each of the first and second inner magnet drums 302, 304. Each drive mechanism 314 further includes at least one eccentric cam 318 coupled to the drive shaft 316. As shown in FIG. 4, for example, in various embodiments, each drive mechanism 314 may include two eccentric cams 318, respectively coupled to opposite ends of the drive mechanism 314. In this manner, as will be described further below, during revolution about the outer drum axis $A_s$, the first and second inner magnet drums 302, 304 may be about 180° out of phase with each other during their orbital revolution within the outer drum magnet in order help balance the eccentric motion of the inner drums 302, 304.

Accordingly, the configuration of the assembly 300 allows each of the inner magnet drums 302, 304 to move as a whole such that each drum's respective axis $A_r$ revolves to trace a path along the dashed line T, while also preventing each of the inner magnet drums 302, 304 from rotating about its own axis $A_r$, in a manner similar to that described above with reference to FIGS. 19A-19D. In other words, as the three shafts 316 rotate together synchronously, the inner magnet drums 302, 304 undergo a wobble effect (eccentric motion) such that their respective axes trace an orbital path along the dashed line T, but those same three shafts 316 also prevent each of the inner magnet drums 302, 304 from rotating about its own respective axis. At the same time, by virtue of the magnetic coupling with the inner magnet drums 302, 304, the outer magnet drum 306 is allowed to freely rotate about its axis $A_s$ in response to the revolution of the first and second inner magnet drums 302, 304. In this manner, each of the drive mechanisms 314 may provide a high speed, low torque input (i.e., to drive the inner magnet drums 302, 304), and the resultant rotary motion of the outer magnet drum 306 may provide a low speed, high torque output (e.g., to drive a mud pipe 380 or other rotary device connected to the outer magnet drum 306).

In various embodiments, for example, in which the outer drum magnets 308 are arranged in a partial Halbach arrangement having 31 pole pairs and each of the inner drum magnets 310, 312 are arranged in a partial Halbach arrangement having 30 pole pairs, in one full revolution of each of the first and second inner magnet drum axes $A_r$ about the dashed line trajectory T, the outer magnet drum 306 rotates 360/31° in the same direction as the inner magnet drums 302, 304, thereby resulting in a gear ratio of 31:1.

Those of ordinary skill in the art would understand, however, that the above described gear arrangements and ratios are exemplary only, and that the outer and inner magnet drums 306 and 302, 304 may having various numbers and arrangements of respective outer and inner drum magnets 308 and 310, 312, each having various numbers of magnetic pole pairs to provide various gear ratios without departing from the present disclosure and claims. Furthermore, the input torques and speeds provided by the drive mechanisms may be varied based on the number of drive mechanisms employed, the gear ratio of the magnet drums, and the required output of the assembly.

In accordance with various exemplary embodiments, to operate a piece of machinery, such as, for example, a top drive 2926 as described above, the plurality of drive mechanisms 314 may include three permanent magnet motors, each including rotor magnets 320 and a stator 322 having end windings (not shown). In various embodiments, as shown in FIG. 4, the motors may be surface permanent magnet motors, and in various additional exemplary embodiments (not shown), the motors may be interior permanent magnet motors.

As above, in accordance with various exemplary embodiments, the first and second inner magnet drums 302, 304 are disposed in an end-to-end arrangement within the outer magnet drum 306, such that respective inner ends 303 and 305 of the first and second inner magnet drums 302, 304 are positioned adjacent to one another. In this manner, as perhaps best shown in FIG. 4, an inner drum cavity 324 is defined between opposite outer ends 301 and 307 of the first and second inner magnet drums 302, 304, and the permanent magnet motors 314 are positioned within the inner drum cavity 324.

Figure 10A:
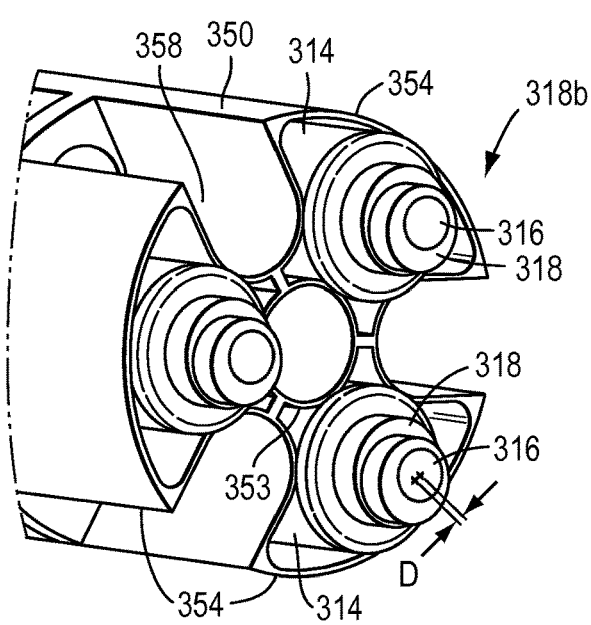
FIGS. 10A and 10B are partial, perspective views of the support structure of FIG. 9, respectively showing eccentric cams at opposite ends of each drive mechanism.

As illustrated in FIGS. 4, 10A, 10B, 11, and 14, each permanent magnet motor drive mechanism 314 has two eccentric cams 318 attached to opposite ends of the rotor shaft 316 of each motor to operatively couple the shaft 316 to the inner magnet drums 302, 304 via, for example, an inner magnetic drum bearing 326. Thus, when positioned within the outer magnet drum 306, the respective outer ends 301, 307 of the inner magnet drums 302, 304 are positioned on the set of cams 318, and the respective inner ends 303, 305 are positioned on a set of s-shaped shafts as described below. For example, with reference to FIGS. 10A and 10B, the outer end 301 of the first inner magnet drum 302 is positioned on a first set 318a of cams 318, which are each respectively coupled to a first end of one of the rotor shafts 316. And the outer end 307 of the second inner magnet drum 304 is positioned on a second set 318b of cams 318, which are each respectively coupled to a second and opposite end of one of the rotor shafts 316. As shown in FIG. 10A, each of the cams 318 is offset by an appropriate distance D to create the eccentric (e.g., wobble) motion of the inner magnet drums 302, 304. In accordance with various embodiments, for example, the offset distance D may be optimized using the procedure described in International Publication No. WO 2014/158968 A1, which is incorporated by reference herein.

Figure 10B:
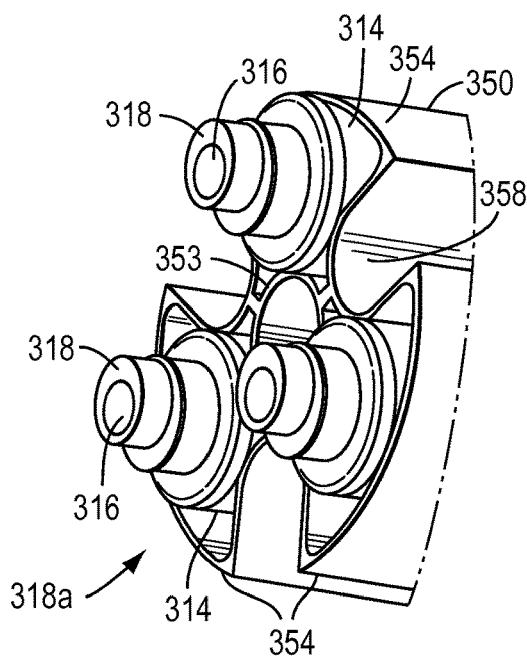

As also shown in FIGS. 10A and 10B, the eccentric cams 318 of each rotor shaft 316 (i.e., at the opposite ends of each motor 314), are also offset from one another by about 180°. In other words, the cams 318 of the first set 318a of cams 318 are offset from the cams 318 of the second set 318b of cams 318. In this manner, during revolution about the outer drum axis $A_s$, the first and second inner magnet drums 302, 304 are about 180° out of phase with each other to help balance the inner drums 302, 304. As above, such a configuration of inner magnet drums, may mechanically balance the assembly 300, thereby eliminating the need for a counterweight. Various additional embodiments, however, contemplate using a counterweight (not shown) within the assembly 300 to help remove secondary vibrations from the assembly 300. In accordance with such embodiments, a counterweight may be added, for example, to an end of one or more of the rotor shafts 316.

The permanent magnet motors 314 and cams 318 shown in FIGS. 4, 10A, 10B, 11, and 14 are a nonlimiting and exemplary mechanism for revolving the inner magnet drums in an eccentric manner about the outer drum axis $A_s$ and other mechanisms may be suitable for achieving the desired revolutionary motion. For example, an alternative mechanism for achieving the revolutionary motion includes using a central motor drive in conjunction with orbital gears to achieve the eccentric wobble revolution motion of the inner magnet drums.

Figure 11:
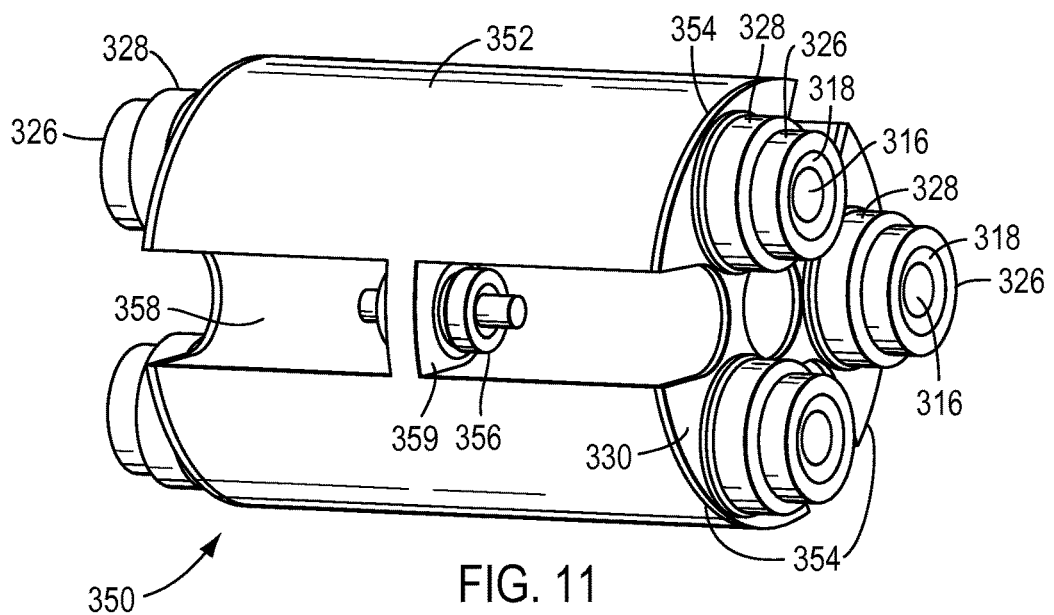
FIG. 11 is another perspective view of the support structure of FIG. 9, showing an exemplary embodiment of a s-shaped shaft in accordance with the present disclosure.
Figure 12:
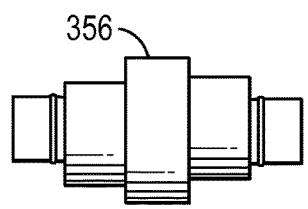
FIG. 12 is an enlarged, perspective view of the s-shaped shaft of FIG. 11.
Figure 13:
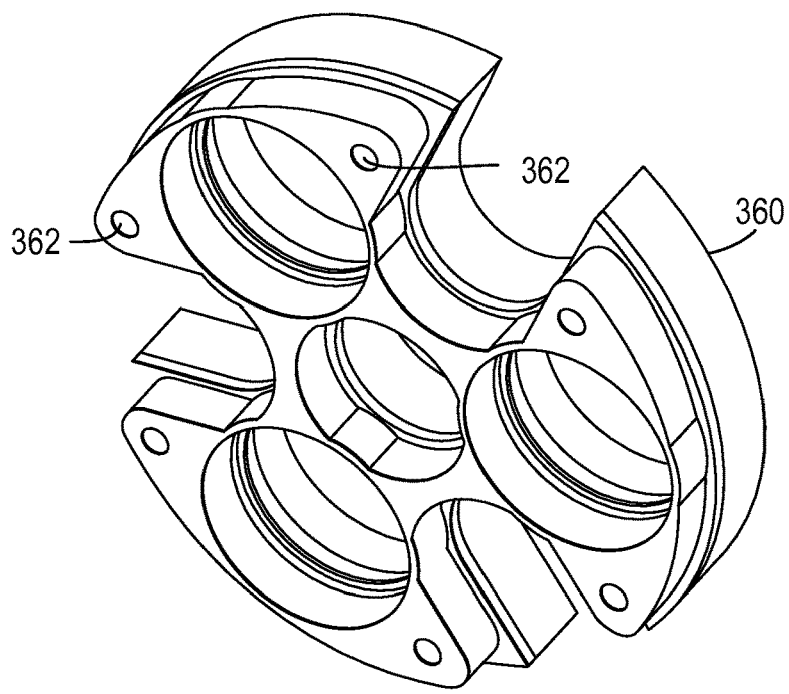
FIG. 13 is a perspective view of an exemplary embodiment of a bearing end plate in accordance with the present disclosure.
Figure 14:
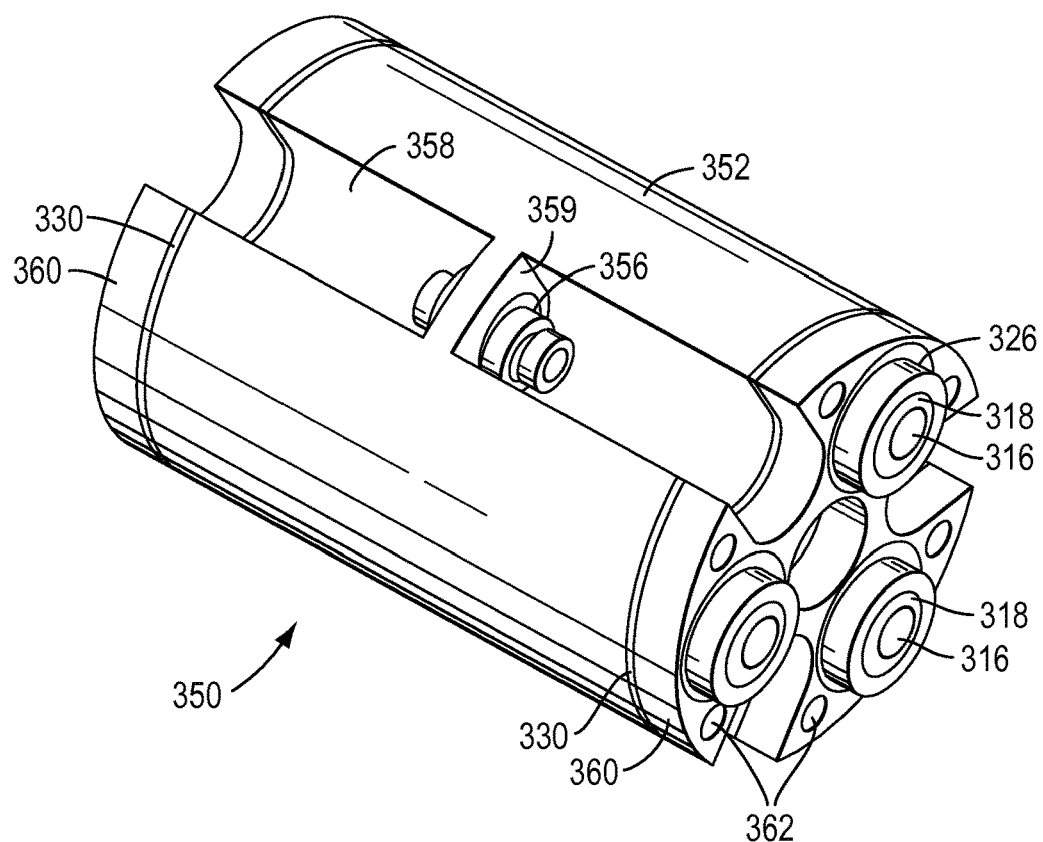
FIG. 14 is a another perspective view of the support structure of FIG. 9 with the bearing end plates attached thereto.

As illustrated in FIGS. 6, 7, 9-11, and 14, the assembly 300 further includes a support structure 350 positioned within the inner drum cavity 324. The support structure 350 may include, for example, a frame structure having a hub and spoke transverse cross-sectional shape along its length. Emanating from a central hub 353 and three hollowed spokes 354, each being configured to receive one of the motors 314. In various exemplary embodiments, to cool the motors 314, a high thermal conductivity, low electrical encapsulate may be disposed inside each hollow spoke 354 to surround each motor 314. As best shown perhaps in FIGS. 11, 12, and 14, the support structure 350 may further include at least one s-shaped shaft 356 (three s-shaped shafts 356 being utilized in the embodiment of FIGS. 3-14, although only one shaft 356 is shown in the views of FIGS. 11 and 14) to receive and support adjacent ends 303, 305 of the inner magnet drums 302, 304 when the inner drums are in the end-to-end arrangement within the outer magnet drum 306. In this manner, the s-shaped shaft 356 may provide a center based support for each of the inner magnet drums, which would otherwise be cantilevered without such support. In the embodiment of FIGS. 3-14, for example, the support structure 350 has a cutout portion 358 every 120° to separate the spokes 354. An s-shaped shaft 356 is positioned within each of the three cutout portions 358, are disposed in each cutout portion 358 to receive and support each shaft 356.

Figure 8:
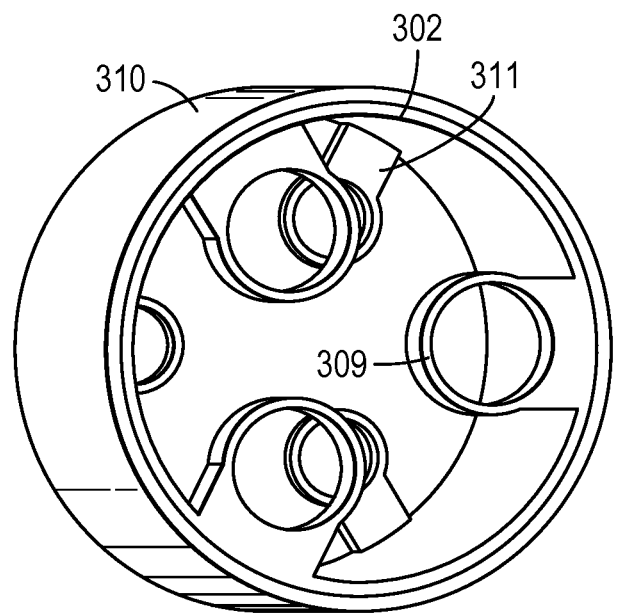
FIG. 8 is a perspective view of an exemplary embodiment of an inner magnet drum in accordance with the present teachings.
Figure 9:
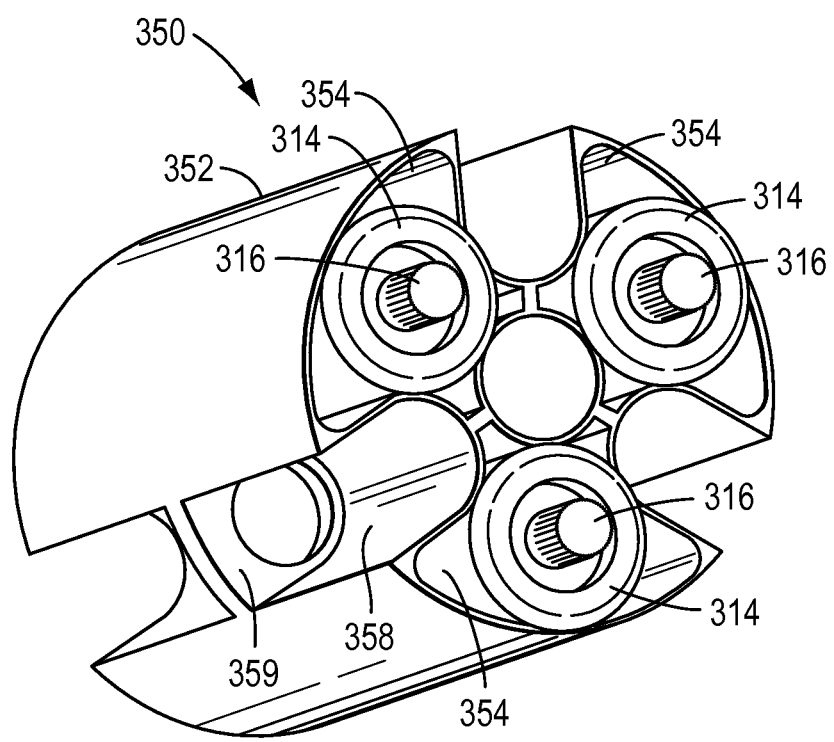
FIG. 9 is a perspective view of an exemplary embodiment of a support structure in accordance with the present disclosure, with drive mechanisms positioned therein.

With reference to FIG. 11, in various exemplary embodiments, the support structure 350 may also be fitted with bearings, such as, for example, inner magnet drum bearings 326 and motor bearings 328 to operatively couple each motor 314 held within the spokes 354 of the support structure 350 to each of the inner magnet drums 302, 304. For example, as shown in FIG. 8, each inner magnet drum 302, 304 may include a set of flanges 311 to engage the s-shaped shafts 356 and a set of flanges 309 to engage the inner magnet drum bearings 326 (which are positioned over the cams 318). In this manner, the outer ends 301, 307 and inner ends 303, 305 of the inner magnet drums 302, 304 are operatively coupled to and supported by the respective bearings 309 and 311 of the support structure 350.

To help support the bearings 326, 328, the ends of the support structure 350 may be covered with caps 330 (see FIG. 14). To further support and capture the bearings 326, 328, the assembly 300 also can include a pair of bearing end plates 360, with one bearing end plate 360 being affixed to each end of the support structure 350. The bearing end plates 360 may, for example, each have openings 362 to allow water and/or oil to be brought into the support structure 350 to cool the motors 314.

Figure 6:
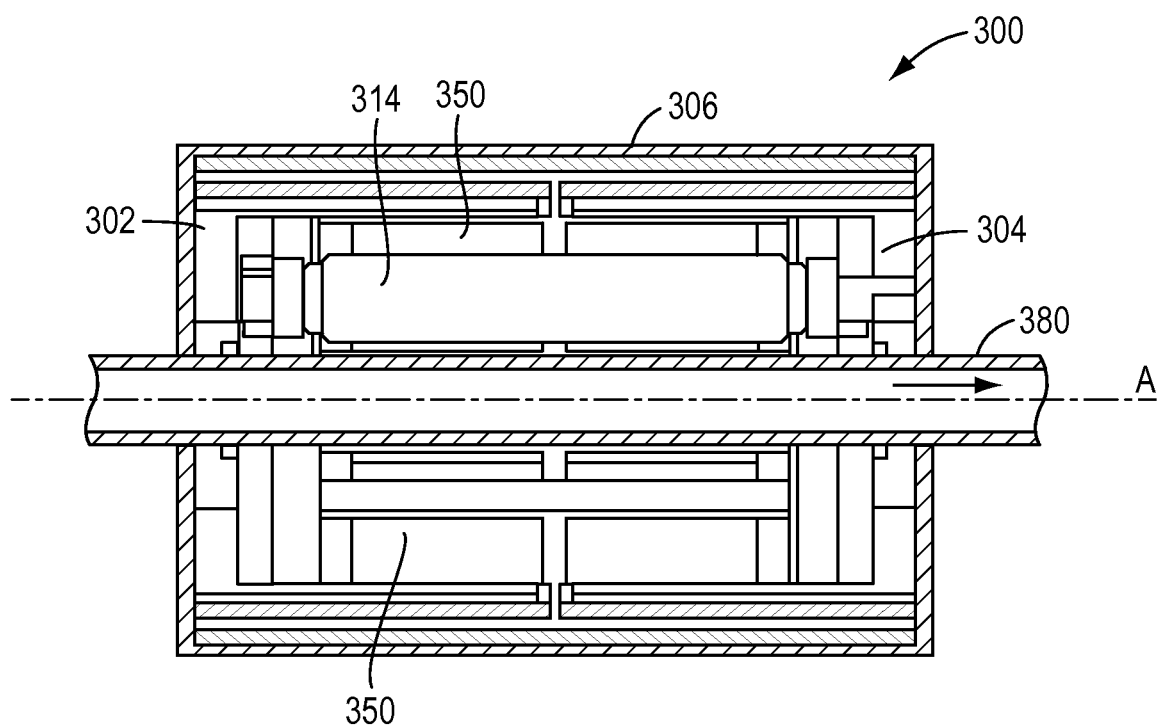
FIG. 6 is a diagrammatic cross-sectional view of the assembly of FIG. 3 taken along line 4-4 in FIG. 3, including the support structure.
Figure 7:
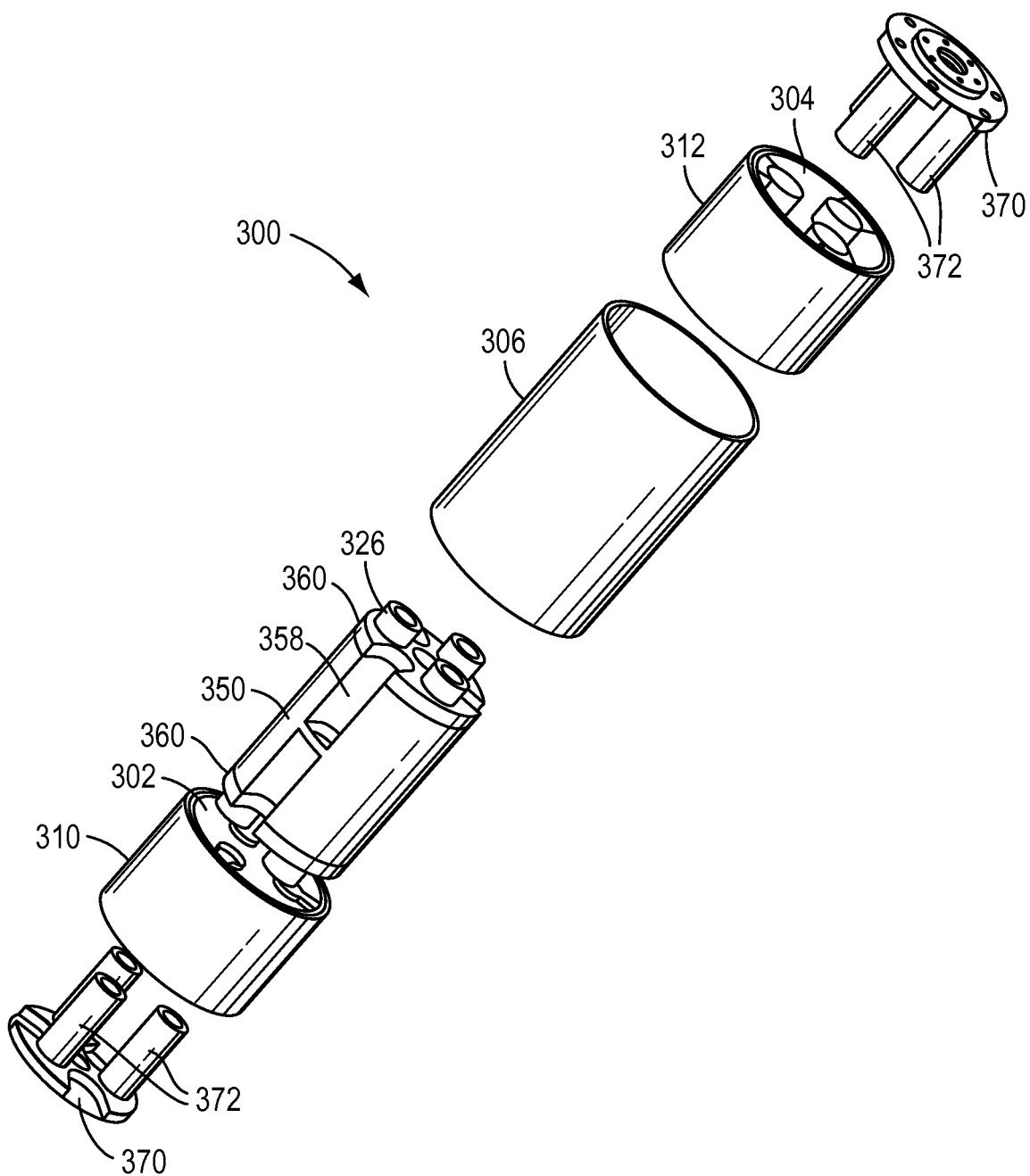
FIG. 7 is an exploded perspective view of the assembly of FIG. 3, including the support structure.

For added support, as shown in FIGS. 4, 5, and 7, in various further exemplary embodiments, the assembly may also include a pair of drum end plates 370. The drum end plates 370 may, for example, be positioned at each end of the assembly 300 and include a plurality of stabilizing legs 372. In the embodiment of FIGS. 3-14, for example, each drum end plate 370 has three stabilizing legs 372, and each stabilizing leg 372 is configured to fit into a cutout portion 358 of the support structure 350 to engage the s-shaped shaft positioned within the cutout portion 358 (see FIG. 4).

As above, those of ordinary skill in the art would understand that the magnetic cycloid gear assembly 300 shown and described with reference to FIGS. 3-14 is exemplary only and that magnetic cycloid gear assemblies in accordance with the present disclosure may have various components in various arrangements, including for example, various numbers, types and/or configurations of inner magnetic drums, bearings, cams, support structures, and/or end plates, without departing from the scope of the present disclosure and claims.

Figure 21:
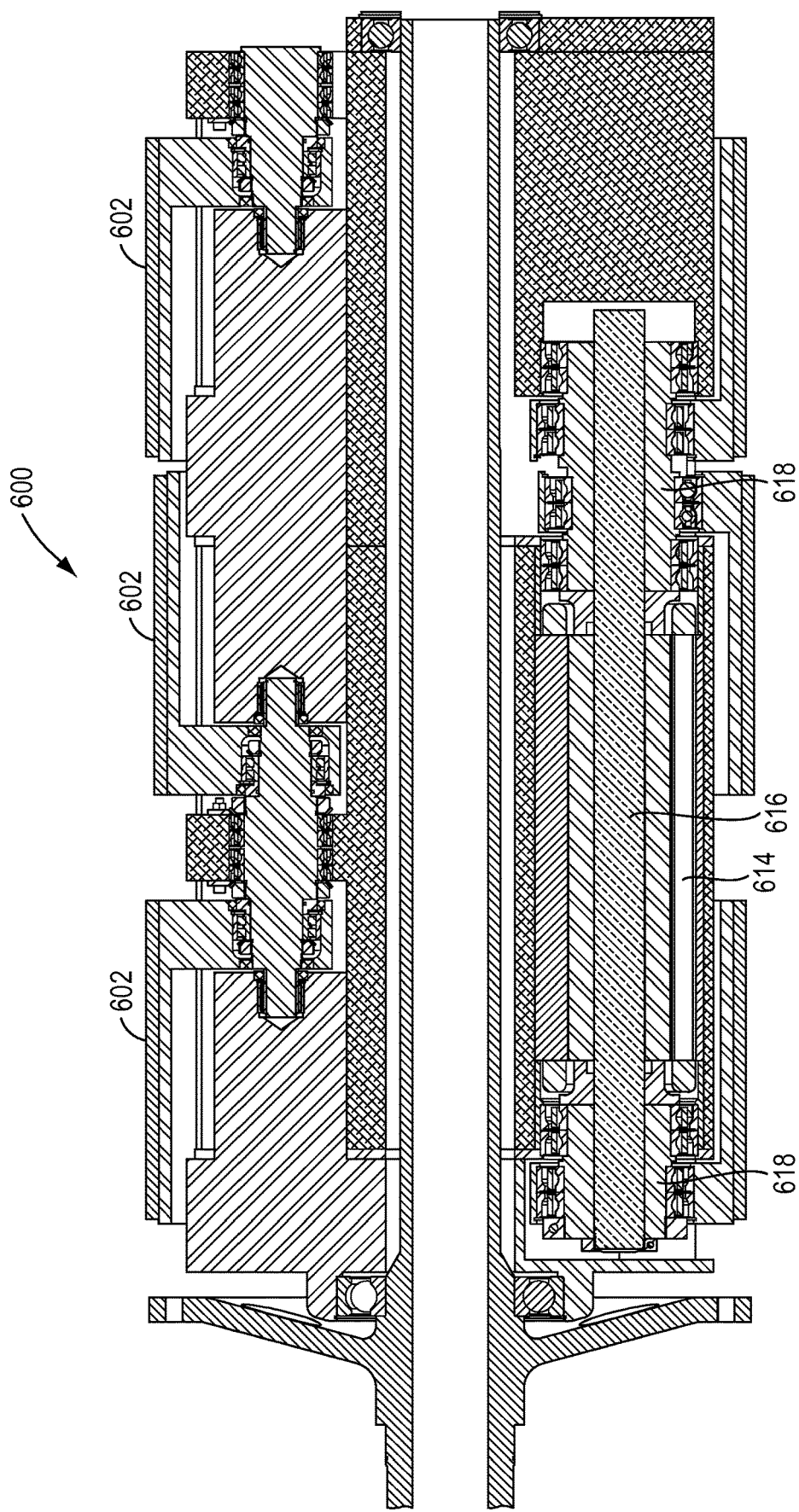
FIG. 21 is a diagrammatic cross-sectional view of yet another exemplary embodiment in accordance with the present disclosure.

Various additional embodiments of the present disclosure, for example, contemplate magnetic cycloid gear assemblies having three, four, or any number of inner magnet drums. As illustrated in FIG. 21 (in which the outer magnet drum has been removed to better show the inner magnet drums), a magnetic cycloid gear assembly 600 may include three inner magnet drums 602 (or three inner gear rings). Similar to the assembly 300, the inner magnet drums 602 are disposed in an end-to-end arrangement within the outer magnet drum (not shown) and are driven by a plurality of permanent magnet motor drive mechanisms 614 (only one drive mechanism being shown in the view of FIG. 21). Each permanent magnet motor drive mechanism 614 has asymmetric cams 618, with eccentric lobes and bearings (e.g., similar to a crankshaft in an engine), attached to opposite ends of a rotor shaft 616 of each motor to operatively couple the shaft 616 to the inner magnet drums 602. Similar to the embodiment of FIG. 20, various additional embodiments also contemplate using a counterweight (not shown) to help balance the assembly 600.

Figure 15:
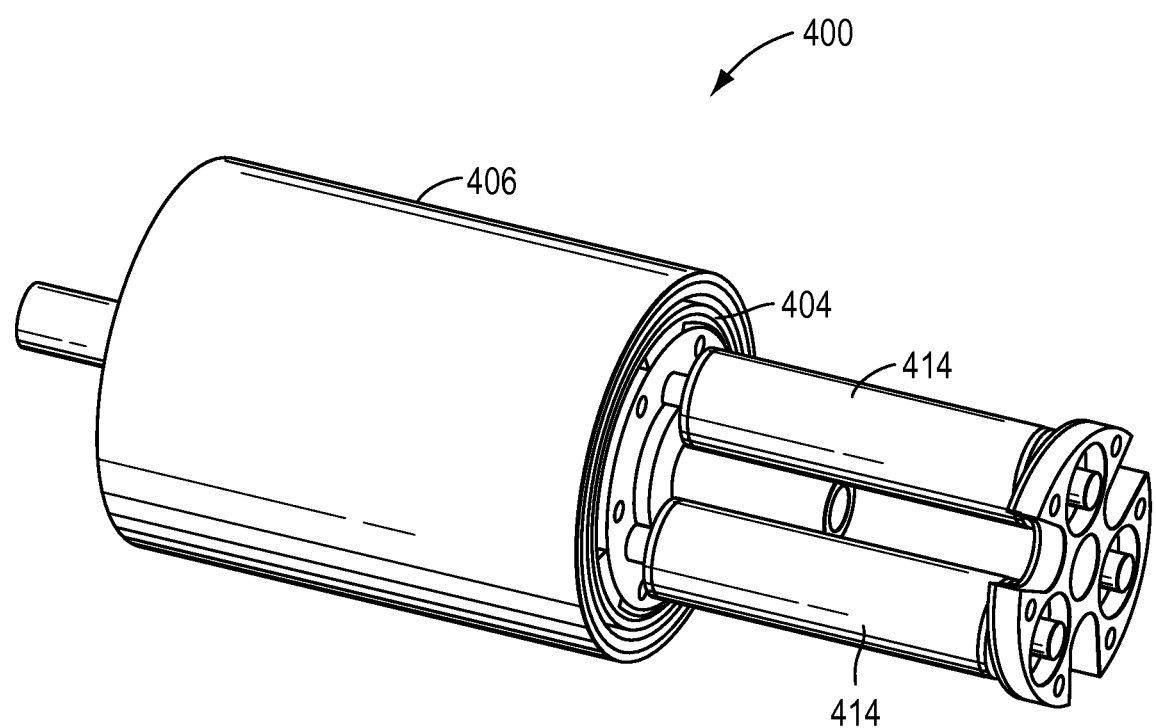
FIG. 15 is a perspective view of another exemplary embodiment of a magnetic cycloid gear assembly for use with a top drive in accordance with the present disclosure.

Furthermore, in accordance with various embodiments, as shown in FIGS. 3-14, to provide a compact assembly, the drive mechanisms (e.g., permanent magnet motors 314) are positioned within the drums of the assembly 300, for example, within the inner drum cavity 324 of the inner magnet drums 302, 304. In accordance with various additional embodiments, however, the drive mechanism may be positioned external to the magnet drums. As shown in FIG. 15, for example, in various embodiments, a magnetic cycloid gear assembly 400 may include permanent magnet motors 414 that are positioned and supported outside the inner drum cavity (not shown). In other words, the motors 414 may be positioned external to both the outer magnetic drum 406 and the inner magnet drums (inner magnet drum 404 being the only inner drum shown in FIG. 15), such as, for example, adjacent to the magnet drums.

Systems Incorporating Magnetic Gear Assemblies

As described above, an eccentric input drive crank shaft drive driven by an external motor or generator may be used to drive the inner magnet drums of a magnetic cycloid gear assembly in the desired motion. However, because the gear ratios that can be achieved by such assemblies are so high, e.g., on the order of about 31:1 or more, the torque required to drive the gear need only deliver about 1/31 or less of the desired output torque. Depending on the output torque requirements for an application of the magnetic cycloid gear assembly, as illustrated in the embodiments of FIGS. 3-14, it may therefore be possible to use relatively small motors, for example, that can be integrated relatively easily as part of the overall gear assembly. For example, as above, various exemplary embodiments contemplate using a magnetic cycloid gear assembly, such as, for example, the assembly 300 to drive rotary equipment associated with oil drilling rigs, such as, for example, drawworks, mud pumps, and/or top drives, as described with reference to FIG. 16 and disclosed for example in International Application Publication No. WO 2013/130936 A2, entitled "Magnetic Gears, and Related Systems and Methods," which is incorporated by reference herein. The ability to provide relatively small, onboard motors to drive the inner magnet drums 302, 304 can be particularly useful in such applications where providing relatively compact parts in light of constraints on space may be desirable.

FIGS. 3, 4, and 6, for example, illustrate the assembly 300 for use in driving a top drive mechanism of an oil drilling rig, wherein 380 represents the pipe (such as pipe 2904 in FIG. 16) of the top drive that carries mud in the direction of the arrow. As would be understood by those of ordinary skill in the art, however, FIGS. 3, 4, and 6 show only one representation of how a magnetic cycloid gear assembly in accordance with the present disclosure can be used with a top drive of an oil drilling rig, and in particular by relying on relatively small onboard permanent magnet motors 314 to drive the inner magnet drums 302, 304.

As above, the permanent magnet motors 314 can be operatively coupled and disposed to directly drive the inner magnet drums 302, 304 to revolve the drums to trace a path along the dashed line T. And, by virtue of the magnetic coupling with the inner magnetic drums 302, 304, the outer magnetic drum 306, which is coupled to the pipe 380, is allowed to freely rotate about its axis $A_s$ in response to the revolution of the first and second inner drum magnets 302, 304. In this manner, each of the motors 314 may provide a high speed, low torque input to drive the inner magnet drums 302, 304, and the resultant rotary motion of the outer magnet drum 306 may provide a low speed, high torque output to the pipe 380.

An exemplary requirement of the motors 314 is now described with reference to the requirements of one exemplary top drive of an oil drilling rig, wherein the desired torque output is about 27,000 ft-lbs and the output speed is about 200 rpm. The motors 314 each drive the inner magnet drums 302, 304 in a revolution about the pipe axis A (see FIGS. 4 and 6) at a rotation rate equal to the gear ratio times the desired output rotation speed. If 31:1 is chosen as the gear ratio, at the speed of 200 rpm, the required drive speed $\Omega$ would be:

$$\Omega = 31 \cdot 200 = 6200 \text{ rpm}. \quad (1)$$

Regardless of the type of motors 314 used, the torque demand $T_{input}$ under the exemplary top drive (i.e., the combined input torque of the motors), which is the desired torque output $T_{output}$ divided by the gear ratio, would be:

$$Tinput = \frac{27000}{31} = 871 \text{ ft-lbs} \quad (2)$$

Thus, when three motors 314 are used, each of the motors 314 must provide 1/3 of this input torque, or about 290 ft-lbs per motor.

Similar computations can be done for other exemplary top drive or rotary equipment specifications/requirements, as would be understood by those having ordinary skill in the art. By way of example only, various exemplary embodiments of the present disclosure contemplate using the magnetic cycloid gear assemblies with an onboard motor drive system to drive top drives that output a maximum continuous torque ranging from about 20,000 ft-lbs to about 35,000 ft-lbs, such as, for example, 25,000 ft-lbs to about 29,000 ft-lbs, at a speed ranging from about 100 rpms to 145 rpms, with a maximum speed ranging from about 200 rpm (revolutions per minute) to about 225 rpm, and a torque density ranging from about 1.5 ft-lb/in$^3$ to about 2.6 ft-lb/in$^3$. It is contemplated that relatively compact arrangements can be used to deliver these specifications, for example, ranging from about 24 in. to about 28 in. in outer diameter D (see FIG. 4) and about 26 in. to about 37 in. in height H (see FIG. 4), in order for example, to accommodate a mud pipe that has an outer diameter ranging from about 2.25 in. to about 3 in. Regardless of the motor selection, in use with a top drive, the mud flow can be considered as a mechanism for cooling the stator. In an exemplary embodiment, if induction motors are used, it may be desirable to provide a blower for cooling the rotor.

Although only a few exemplary embodiments have been described in detail above, those skilled in the art will readily appreciate that various modifications are possible in the example embodiments without materially departing from this disclosure. Accordingly, all such modifications are intended to be included within the scope of this disclosure. By way of example, those having ordinary skill in the art will appreciate that the magnetic cycloid gear assemblies in accordance with various exemplary embodiments can be used in a variety of applications other than to drive rotary equipment associated with oil drilling rigs, with appropriate modifications being determined from routine experimentation based on principles set for the herein.

Figure 18:
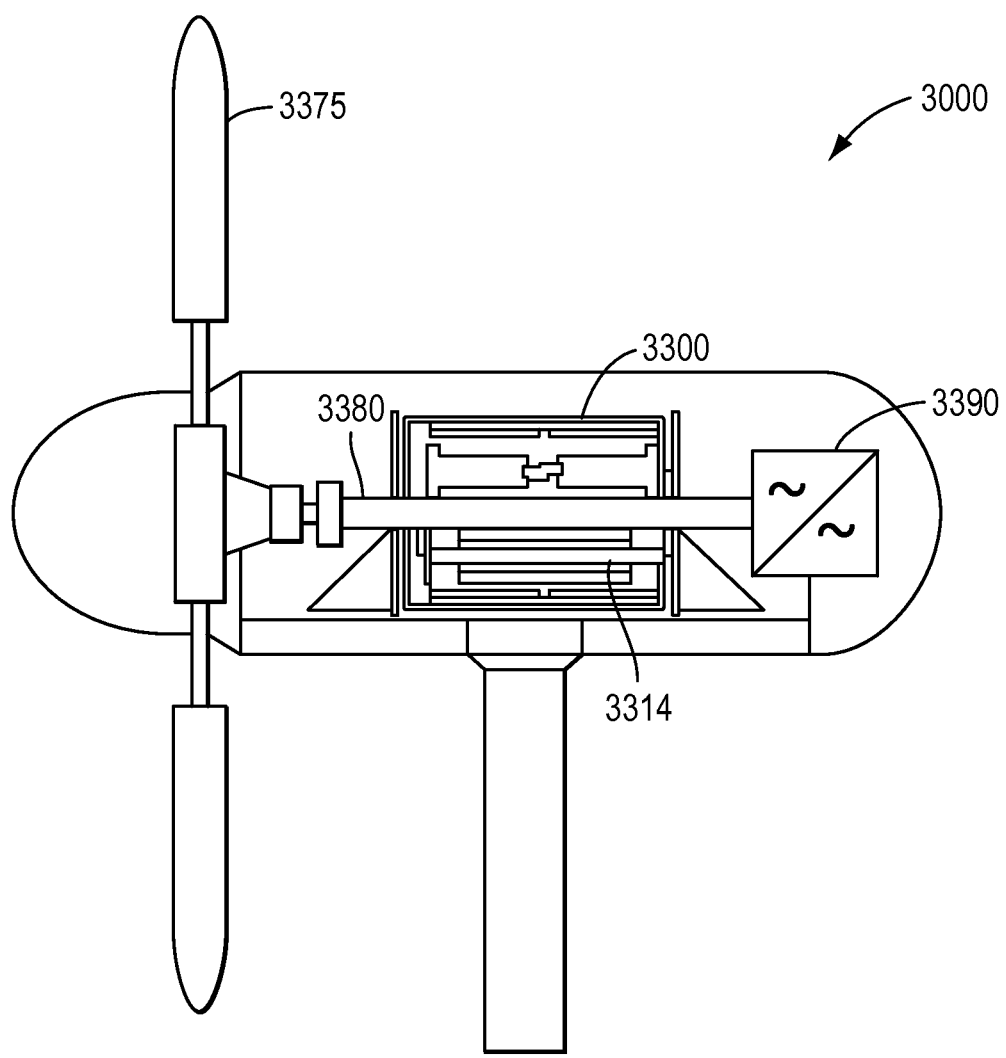
FIG. 18 is a partial, schematic view of an exemplary windmill with which magnetic cycloid gear assemblies in accordance with various exemplary embodiments of the present disclosure may be used to generate electricity.
Figure 19A:
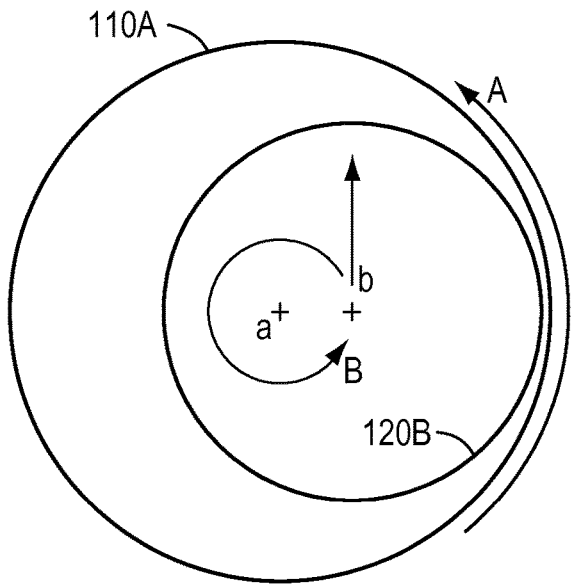
FIGS. 19A-19D show schematic representations of relative motion of an inner magnetic gear ring and an outer magnetic gear ring in accordance with various exemplary embodiments.
Figure 19B:
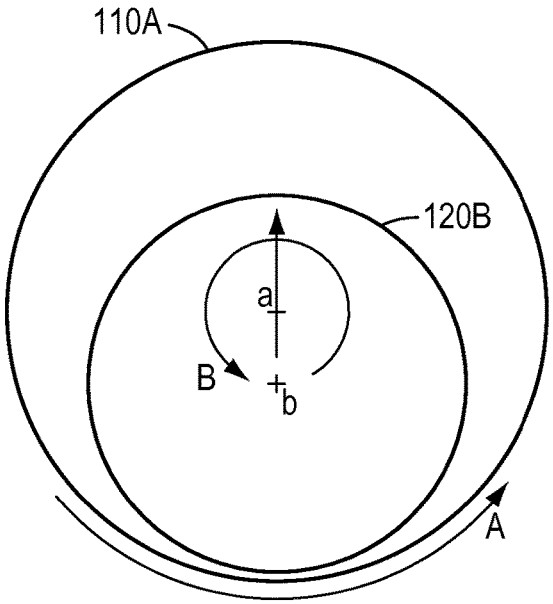
Figure 19C:
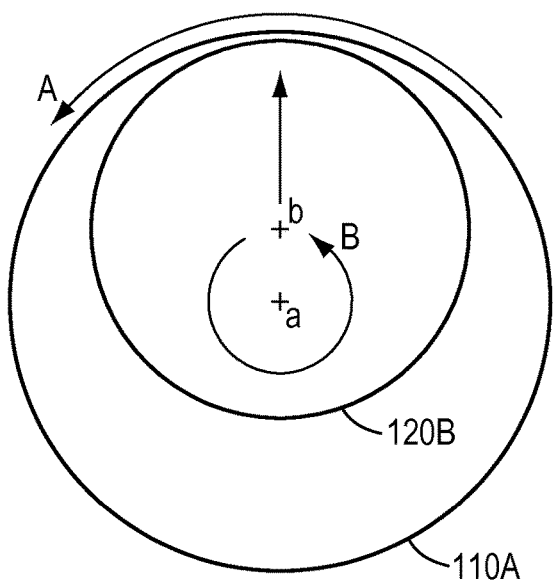
Figure 19D:
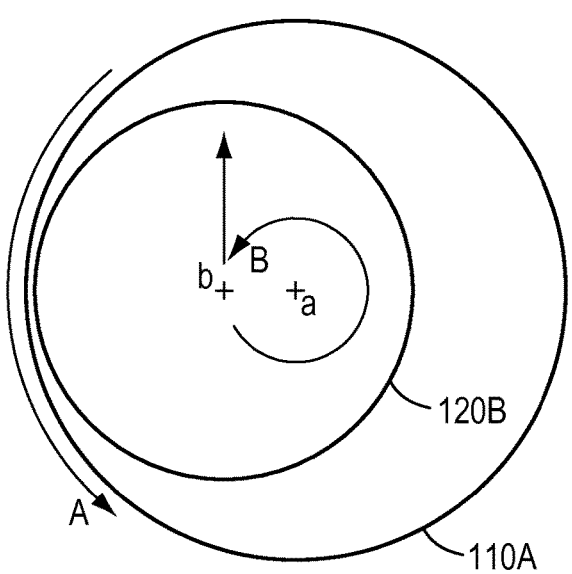

Various additional embodiments of the present disclosure contemplate, for example, using the magnetic cycloid gear assemblies disclosed herein within a windmill system to generate power. As illustrated, for example, in FIG. 18, a windmill 3000 may include a magnetic cycloid gear assembly 3300, which includes generators (instead of motors), such as, for example, three permanent magnet generators 3314. In such embodiments, for example, blades 3375 of the windmill 3000 may be coupled to a main shaft 3380, which in turn may drive the permanent magnet or induction generators 3314 to generate power via an inverter 3390.

It is to be understood that the various embodiments shown and described herein are to be taken as exemplary. Elements and materials, and arrangements of those elements and materials, may be substituted for those illustrated and described herein, and portions may be reversed, all as would be apparent to one skilled in the art after having the benefit of the description herein. Changes may be made in the elements described herein without departing from the spirit and scope of the present disclosure and following claims, including their equivalents.

Those having ordinary skill in the art will recognize that various modifications may be made to the configuration and methodology of the exemplary embodiments disclosed herein without departing from the scope of the present teachings. By way of example only, the cross-sectional shapes and relative sizes of the magnet drums may be modified and a variety of cross-sectional configurations may be utilized, including, for example, circular or oval cross-sectional shapes. Moreover, as above, those having ordinary skill in the art would understand that the various dimensions, number of magnets and pole pairs, etc. discussed with respect to exemplary embodiments are nonlimiting and other sizes and configurations are contemplated as within the scope of the present disclosure and can be selected as desired for a particular application.

Those having ordinary skill in the art also will appreciate that various features disclosed with respect to one exemplary embodiment herein may be used in combination with other exemplary embodiments with appropriate modifications, even if such combinations are not explicitly disclosed herein.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the magnetic gears, systems, and methods of the present disclosure without departing from the scope the present disclosure and appended claims. Other embodiments of the disclosure will be apparent to those skilled in the art from consideration of the specification and practice of the disclosure disclosed herein. It is intended that the specification and examples be considered as exemplary only.

What is claimed is:

1. A magnetic cycloid gear assembly comprising:
   an outer magnet drum comprising a plurality of outer drum magnets having a first number of magnetic pole pairs, wherein the outer magnet drum has an outer magnet drum axis;
   a first inner magnet drum comprising a first plurality of inner drum magnets having a second number of magnetic pole pairs, wherein the first inner magnet drum has a first inner magnet drum axis that is offset from the outer magnet drum axis;
   a second inner magnet drum comprising a second plurality of inner drum magnets having a third number of magnetic pole pairs, wherein the second inner magnet drum has a second inner magnet drum axis that is offset from the outer magnet drum axis, wherein the outer magnet drum surrounds the inner magnet drums; and
   a plurality of drive mechanisms, each drive mechanism being operatively coupled to each of the first and second inner magnet drums, the plurality of drive mechanisms being configured to drive each of the first and second inner magnet drums to revolve in an eccentric manner about the outer magnet drum axis,
   wherein the outer magnet drum is configured to rotate about the outer magnet drum axis in response to revolution of the first and second inner magnet drums.

2. The magnetic cycloid gear assembly of claim 1, wherein at least one of the second and third number of magnetic pole pairs differs from the first number of magnetic pole pairs.

3. The magnetic cycloid gear assembly of claim 2, wherein the second and third number of magnetic pole pairs are equal to each other.

4. The magnetic cycloid gear assembly of claim 1, wherein the first and second inner magnet drums are positioned about 180 degrees apart from each other about the outer magnet drum axis.

5. The magnetic cycloid gear assembly of claim 1, wherein each of the plurality of drive mechanisms comprises a drive shaft that is configured to rotate and to support each of the first and second inner magnet drums, the drive shafts being configured to rotate synchronously with each other.

6. The magnetic cycloid gear assembly of claim 1, wherein each of the plurality of drive mechanisms provides a high speed, low torque input, and
   wherein a rotary motion of the outer magnet drum is a low speed, high torque output.

7. The magnetic cycloid gear assembly of claim 1, wherein the plurality of drive mechanisms comprise three permanent magnet motors, wherein an output rotor shaft of each of the motors is coupled to drive the first and second inner magnet drums.

8. The magnetic cycloid gear assembly of claim 7, wherein the permanent magnet motors are positioned external to the first and second inner magnet drums.

9. The magnetic cycloid gear assembly of claim 7, wherein the first and second inner magnet drums are disposed in an end-to-end arrangement within the outer magnet drum.

10. The magnetic cycloid gear assembly of claim 9, wherein an inner drum cavity is defined within the first and second inner magnet drums between opposite ends of the first and second inner magnet drums, the permanent magnet motors be positioned within the inner drum cavity.

11. The magnetic cycloid gear assembly of claim 10, wherein each permanent magnet motor has two eccentric cams, the cams being attached to opposite ends of the respective output rotor shaft of each motor to operatively couple the rotor shafts to the first and second inner magnet drums.

12. The magnetic cycloid gear assembly of claim 10, further comprising a support structure positioned within the inner drum cavity, the support structure comprising a frame with three voids, each void being configured to hold one of the permanent magnet motors.

13. The magnetic cycloid gear assembly of claim 12, further comprising a high thermal conductivity, low electrical conductivity encapsulant disposed inside each void to surround each permanent magnet motor.

14. The magnetic cycloid gear assembly of claim 12, wherein the support structure further comprises at least one s-shaped shaft, the at least one s-shaped shaft being configured to receive and support adjacent ends of the first and second inner magnet drums when the first and second inner magnet drums are in the end-to-end arrangement within the outer magnet drum.

15. The magnetic cycloid gear assembly of claim 1, wherein the plurality of drive mechanisms comprise three permanent magnet generators.

16. A system comprising:
   the magnetic cycloid gear assembly of claim 1, wherein each of the plurality of drive mechanisms is configured to provide a high speed, low torque input to drive the first and second inner magnet drums;
   a low speed, high torque output shaft operatively coupled to the outer magnet drum of the magnetic cycloid gear assembly; and
   rotary equipment associated with an oil drilling rig operatively coupled to the output shaft.

17. The system of claim 16, wherein the rotary equipment is chosen from a top drive, drawworks, and a mud pump.

18. A method of torque conversion comprising:
   revolving first and second inner magnet drums within an outer magnet drum in an eccentric manner about an axis of rotation of the outer magnet drum, wherein each of the first and second inner magnet drums comprises, respectively, a first plurality of magnets having a first number of pole pairs and a second plurality of magnets having the first number of pole pairs, and the outer magnet drum comprises a third plurality of magnets having a second number of pole pairs that differs from the first number of pole pairs, wherein the revolving is provided by a plurality of drive mechanisms each configured to provide a high speed, low torque input; and
   in response to the revolving of the first and second inner magnet drums, causing the outer magnet drum to rotate about the axis of rotation of the outer magnet drum to provide a low speed, high torque output.

19. The method of claim 18, wherein revolving the first and second inner magnet drums about the axis of rotation of the outer magnet drum includes revolving the first and second inner magnet drums about 180 degrees out of phase from each other.

20. The method of claim 18, further comprising converting the high speed, low torque input to the low speed, high torque output at a ratio greater than 15:1.

* * * * *